(12) United States Patent
Tanaka et al.

(10) Patent No.: US 8,305,538 B2
(45) Date of Patent: Nov. 6, 2012

(54) LOW-COST LARGE-SCREEN WIDE-ANGLE FAST-RESPONSE LIQUID CRYSTAL DISPLAY APPARATUS

(75) Inventors: Sakae Tanaka, Mito (JP); Toshiyuki Samejima, Kodaira (JP)

(73) Assignee: Mikuni Electoron Co., Ltd. (JP)

( * ) Notice: Subject to any disclaimer, the term of this patent is extended or adjusted under 35 U.S.C. 154(b) by 0 days.

(21) Appl. No.: 13/239,500

(22) Filed: Sep. 22, 2011

(65) Prior Publication Data

US 2012/0038875 A1     Feb. 16, 2012

Related U.S. Application Data

(62) Division of application No. 12/558,086, filed on Sep. 11, 2009, now Pat. No. 8,194,227, and a division of application No. 11/743,749, filed on May 3, 2007.

(30) Foreign Application Priority Data

Jun. 15, 2006    (JP) ................................ 2006-202563

(51) Int. Cl.
*G02F 1/1343*      (2006.01)

(52) U.S. Cl. .......................................... 349/141; 349/39

(58) Field of Classification Search .................... 349/38, 349/39, 129–131, 114, 141
See application file for complete search history.

(56) References Cited

U.S. PATENT DOCUMENTS

| | | | |
|---|---|---|---|
| 6,177,970 B1 | 1/2001 | Kim | |
| 6,452,658 B1 * | 9/2002 | Park et al. | ...................... 349/141 |
| 6,462,800 B1 | 10/2002 | Kim et al. | |
| 6,784,955 B2 | 8/2004 | Kwok et al. | |
| 7,495,733 B2 | 2/2009 | Lee et al. | |
| 2003/0095219 A1 | 5/2003 | Lee | |

(Continued)

FOREIGN PATENT DOCUMENTS

JP       07230097      8/1995

(Continued)

OTHER PUBLICATIONS

Office Action (Mail Date Apr. 2, 2009) for U.S. Appl. No. 11/743,749, filed May 3, 2007.

(Continued)

*Primary Examiner* — Mark Robinson
*Assistant Examiner* — Michael Inadomi
(74) *Attorney, Agent, or Firm* — Schmeiser, Olsen & Watts, LLP

(57) ABSTRACT

A super large wide-angle high-speed response liquid crystal display apparatus manufactured by using a photolithographic procedure for three times. The invention adopts a halftone exposure technology to form a gate electrode, a common electrode, a pixel electrode and a contact pad, and then uses the halftone exposure technology to form a silicon (Si) island and a contact hole, and a general exposure technology to form a source electrode, a drain electrode and an orientation control electrode. A passivation layer uses a masking deposition method. A film is formed by using a P-CVD method, or a protective area is formed at a local area by using an ink coating method or spray method, and a TFT array substrate used for the super large wide-angle high-speed response liquid crystal display apparatus manufactured by using a photolithographic procedure for three times can be produced.

1 Claim, 42 Drawing Sheets

U.S. PATENT DOCUMENTS

| | | |
|---|---|---|
| 2004/0114059 A1 | 6/2004 | Lee et al. |
| 2005/0024548 A1 | 2/2005 | Choi et al. |
| 2005/0036091 A1 | 2/2005 | Song |
| 2006/0055861 A1 | 3/2006 | Hirota |
| 2007/0291209 A1 | 12/2007 | Tanaka et al. |
| 2008/0231781 A1 | 9/2008 | Ge et al. |
| 2010/0066930 A1 | 3/2010 | Tanaka et al. |
| 2010/0066931 A1 | 3/2010 | Tanaka et al. |
| 2010/0066962 A1 | 3/2010 | Tanaka et al. |
| 2010/0309420 A1 | 12/2010 | Tanaka et al. |

FOREIGN PATENT DOCUMENTS

| | | |
|---|---|---|
| JP | 11109393 | 4/1999 |
| JP | 2001042347 | 2/2001 |

OTHER PUBLICATIONS

Office Action (Mail Date Dec. 29, 2009) for U.S. Appl. No. 11/743,749, filed May 3, 2007.

Office Action (Mail Date Dec. 7, 2010) for U.S. Appl. No. 11/743,749, filed May 3, 2007.

Office Action (Mail Date Aug. 19, 2011) for U.S. Appl. No. 11/743,749, filed May 3, 2007.

Office Action (Mail Date Oct. 25, 2010) for U.S. Appl. No. 12/558,050, filed Sep. 11, 2009.

Office Action (Mail Date Sep. 21, 2011) for U.S. Appl. No. 12/558,065, filed Sep. 11, 2009.

* cited by examiner

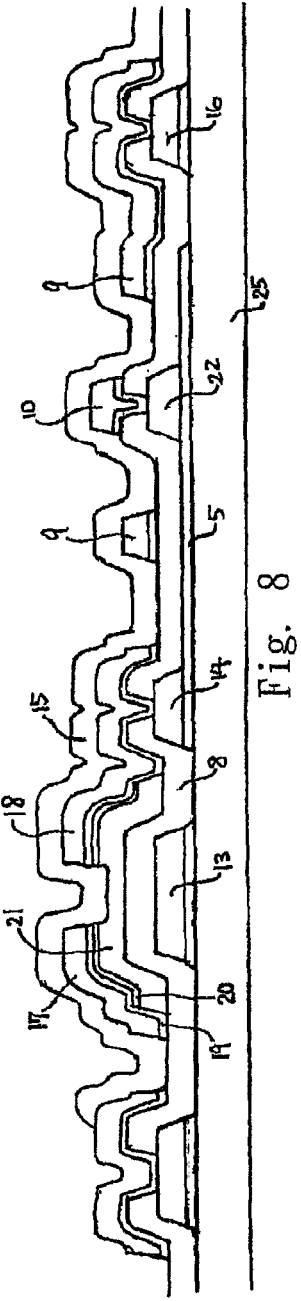
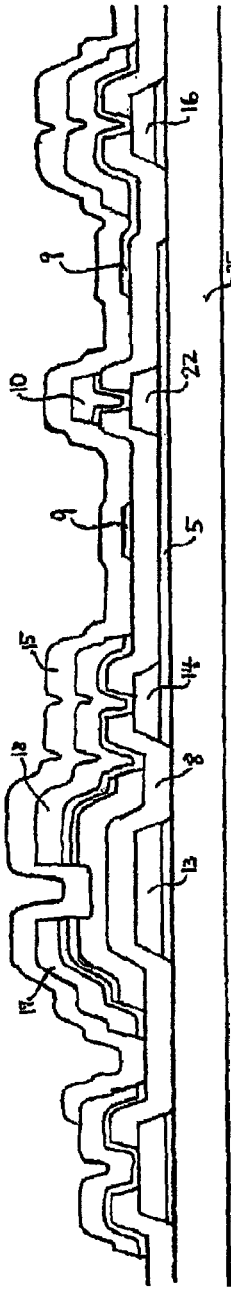
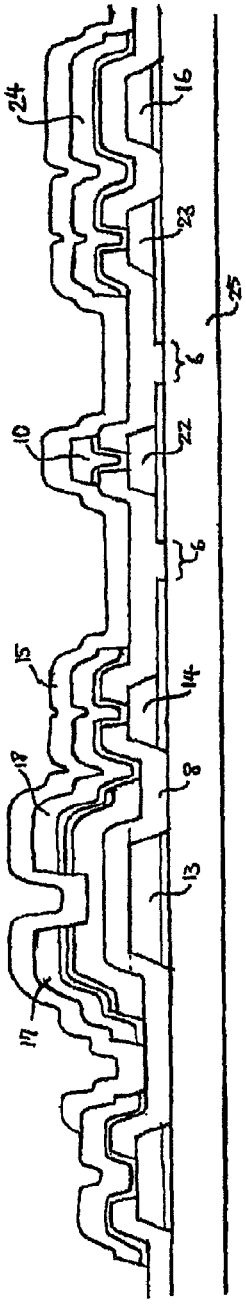
Fig. 8 Photolithographic procedure for 3 times (Halftone exposure for 2 times)
Fig. 9 Photolithographic procedure for 3 times (Halftone exposure for 2 times)
Fig. 10 Photolithographic procedure for 3 times (Halftone exposure for 2 times)

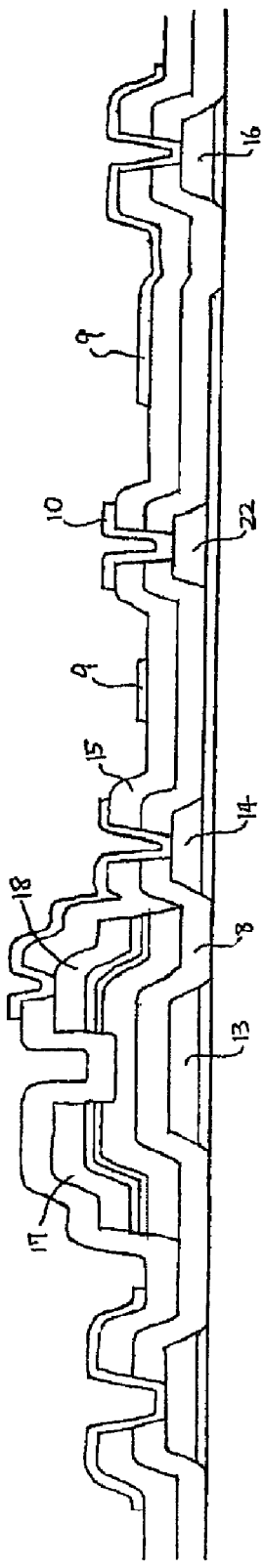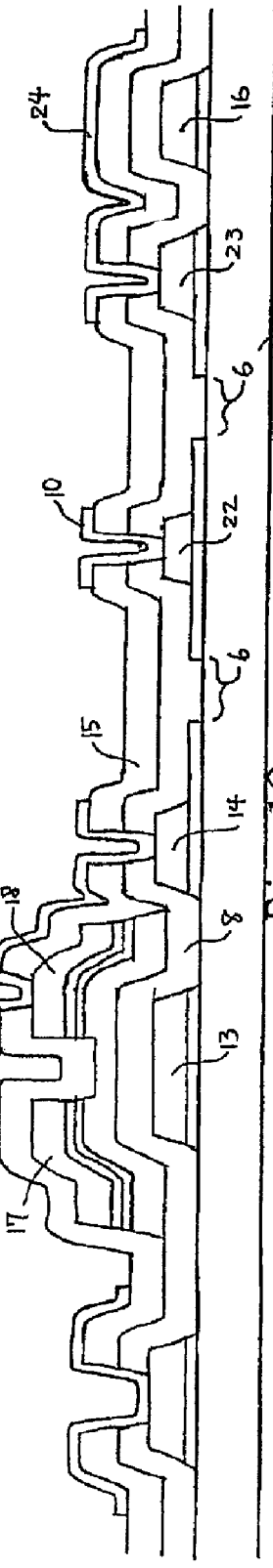

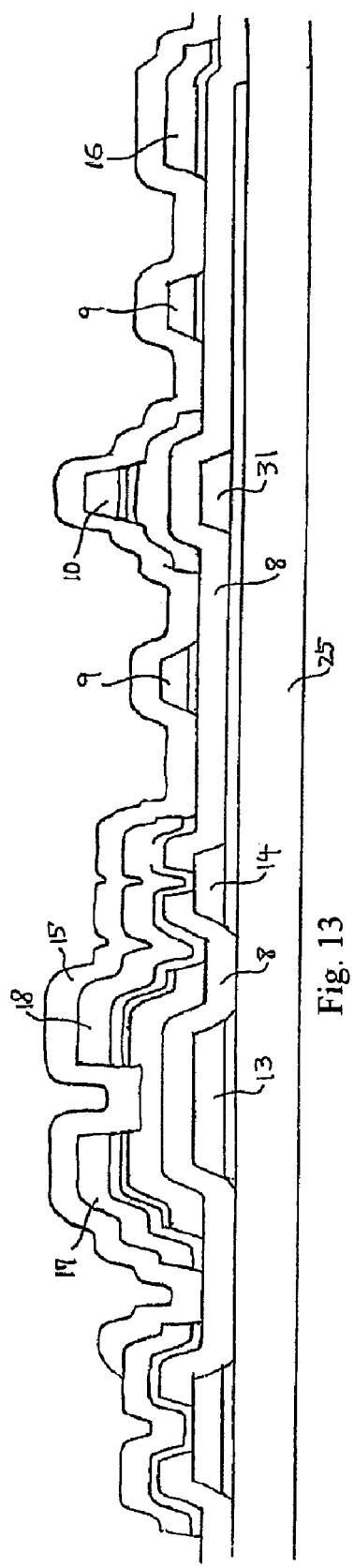
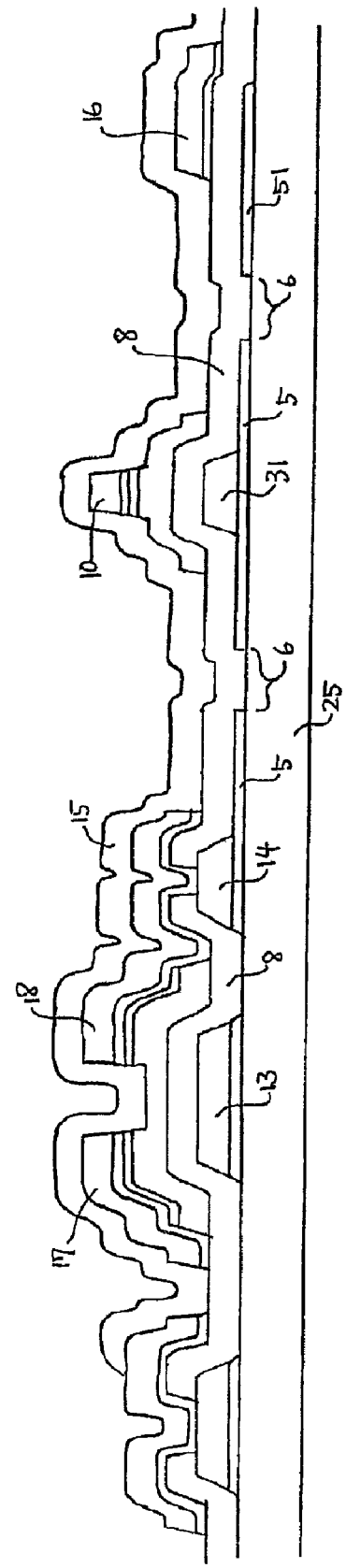
Fig. 13
Fig. 14

Poor orientation area     Poor orientation area

Fig. 61

MVA Mode Using a Photolithographic Procedure for Three Times (A)

(1) Form a gate electrode, a pixel electrode, a common electrode and a contact pad in the pixel electrode (wherein the photolithographic procedure uses a halftone exposure method for the first time).

(2) Form a separate thin film semiconductor layer component, and a contact hole (wherein the photolithographic procedure uses a halftone exposure method for the second time).

(3) Form a source electrode, a drain electrode and an orientation control electrode (wherein the photolithographic procedure uses a general exposure method).

After an ohmic contact layer of a channel portion of the thin film transistor is dry etched, a partial film of a passivation layer is formed by a silicon nitride film by using a mask deposition method (wherein the film is formed at a terminal portion other than those of a gate electrode, a source electrode and a common electrode).

Fig. 62

<u>MVA Mode Using a Photolithographic Procedure for Three Times (B)</u>

(1) Form a gate electrode, a pixel electrode and a contact pad in the pixel electrode (wherein the photolithographic procedure uses a halftone exposure method for the first time).

(2) Form a separate thin film semiconductor layer component, and a contact hole (wherein the photolithographic procedure uses a halftone exposure method for the second time).

(3) Form a source electrode, a drain electrode, an orientation control electrode and a common electrode (wherein the photolithographic procedure uses a general exposure method).

After an ohmic contact layer of a channel portion of the thin film transistor is dry etched, a partial film of a passivation layer is formed by a silicon nitride film by using a mask deposition method (wherein the film is formed at a terminal portion other than those of a gate electrode, a source electrode and a common electrode).

Fig. 63

IPS Mode Using a Photolithographic Procedure for Three Time (C)

(1) Form a gate electrode, a comb pixel electrode, a common electrode for shielding a video signal line (or a source electrode), a contact pad in the pixel electrode, and a video signal line for shielding the contact pad in common electrode (wherein the photolithographic procedure uses a halftone exposure method for the first time).

(2) Form a separate thin film semiconductor layer component, and a contact hole (wherein the photolithographic procedure uses a halftone exposure method for the second time).

(3) Form a source electrode (or video signal line), a drain electrode, a common electrode at the center of a pixel and a comb common electrode (wherein the third time of photolithographic procedure uses a halftone exposure method).

After an ohmic contact layer of a channel portion of the thin film transistor is dry etched, a partial film of a passivation layer is formed by a silicon nitride film by using a mask deposition method (wherein the film is formed at a terminal portion other than those of a gate electrode, a source electrode and a common electrode).

Fig. 64

FFS Mode Using a Photolithographic Procedure for Three Times (D)

(1) Form a gate electrode, a pixel electrode and a contact pad in the pixel electrode (wherein a first time of applying the photolithographic procedure adopts a halftone exposure method).

(2) Form a separate thin film semiconductor layer component, and a contact hole (wherein a second time of applying the photolithographic procedure adopts a halftone exposure method).

(3) Form a source electrode (or a video signal line), a drain electrode, a common electrode at the center of a pixel and a comb common electrode (wherein a third time of applying the photolithographic procedure adopts a halftone exposure method).

After an ohmic contact layer of a channel portion of the thin film transistor is dry etched, a partial film of a passivation layer is formed by a silicon nitride film by using a mask deposition method (wherein the film is formed at a terminal portion other than those of a gate electrode, a source electrode and a common electrode).

LOW-COST LARGE-SCREEN WIDE-ANGLE FAST-RESPONSE LIQUID CRYSTAL DISPLAY APPARATUS

RELATED APPLICATIONS

This application is a divisional application claiming priority to Ser. No. 12/558,086 filed on Sep. 11, 2009, which is a divisional application of Ser. No. 11/743,749, filed on May 3, 2007.

FIELD OF THE TECHNOLOGY

The present invention relates to a large-screen wide-angle liquid crystal display apparatus manufactured by using a halftone exposure method.

BACKGROUND

In multi-domain vertical alignment (MVA) liquid crystal display apparatuses, an alignment control electrode for controlling an alignment of a liquid crystal molecule has been disclosed in Japan Laid Open Patents Nos. 07-230097, 11-109393 and 2001-042347.

SUMMARY

In view of the shortcomings of the prior art, the inventor of the present invention based on years of experience in the related industry conducting research and experiments, finally developed a large-screen wide-angle liquid crystal display apparatus in accordance with the present invention to overcome the foregoing shortcomings.

Therefore, it is a primary objective of the present invention to adopt a prior art alignment control electrode of a liquid crystal display (LCD) panel structure to correspond to smaller pixels. Because only one type of alignment control electrode is used, and the edge field effect of a pixel electrode is adopted, it is not applicable for lager pixels.

At present, the mainstream of multi-domain vertical alignment (MVA) liquid crystal display apparatus generally uses a bump or slit electrode for the alignment control of the sides of a color filter (CF) substrate, and this method can make a proper alignment if the pixel is large, but the cost of CF substrates is high, and becomes an obstacle for manufacturing a large-screen liquid crystal TV by a low cost.

Therefore, it is a primary objective of the present invention to reduce the number of photolithographic procedures of the transparent thin film transistor (TFT) active matrix substrate and the CF substrate during the manufacture of the TFT active matrix liquid crystal display apparatus in order to shorten the manufacturing procedure, lowering the manufacturing cost, and improving the yield rate.

The technical measures taken by the present invention are described as follows.

In Measure 1, unstable and swinging discrimination lines are avoided, and two types of alignment control electrodes are installed at an upper layer of a pixel electrode through an insulating film, and between common electrodes corresponding to the pixel electrodes. With the foregoing two different types of alignment control electrodes, the oblique direction of anisotropic liquid crystal molecules having a negative dielectric constant can be controlled precisely.

In Measure 2, one type of alignment control electrode is installed at an upper layer of a pixel electrode through an insulating film, and a slender slit is formed in the pixel electrode, and these two alignment control mechanisms can control the oblique direction of anisotropic liquid crystal molecules having a negative dielectric constant precisely.

In Measure 3, the alignment control electrodes as used in Measures 1 and 2 are connected to the pixel electrodes as close to the substrate as possible.

In Measure 4, the alignment control mechanisms as used in Measures 1 and 2 provide four perfect area alignments for a curvature of 90 degrees at a position proximate to the center of the pixel.

In Measure 5, a halftone exposure method is introduced into the manufacturing process of the TFT array substrate to reduce the number of photolithographic procedures.

In Measure 6, a basic unit pixel is divided into two sub pixels, and the common electrodes are installed parallelly on a video signal line, and the common electrodes of odd-numbered rows and even-numbered rows switch signals with different polarities in each scan period, and produce different voltages applied to the liquid crystal molecules of the two sub pixels.

With Measures 1 and 2, the TFT array substrate has all alignment control functions, and thus it is not necessary to form a pad or slit on the CF substrate for the alignment control, so that the MVA LCD panel can be manufactured with a low-cost CF substrate to lower the cost and improve the yield rate.

With Measure 3, the alignment control electrode connected to the pixel electrode is proximate to the substrate for enhancing the rotational torque of an electric field of anisotropic liquid crystal molecules having negative dielectric constant and acted at the vertical alignment, so as to achieve a high-speed response.

With Measure 4, unnecessary discrimination lines can be avoided to improve the overall light transmission rate of the screen and reduce unevenness of the LCD panel.

With Measures 1, 2 and 5, the processing costs for both CF substrate and TFT array substrate can be lowered, and thus the manufacturing cost of MVA LCD panels can be lowered significantly; the production efficiency can be improved, and the yield rate can be enhanced.

With Measures 5 and 6, the liquid crystal alignment control mechanism can be manufactured by a very simple manufacturing process, and the correction of γ curve can be achieved by a very simple circuit, and thus a little cost is incurred for enhancing the display quality of a MVA liquid crystal display apparatus.

BRIEF DESCRIPTION OF THE DRAWINGS

FIG. 8 is a cross-sectional view of a MVA LCD panel adopting a TFT matrix substrate in accordance with the present invention;

FIG. 9 is a cross-sectional view of a TFT array substrate used for a MVA LCD panel in accordance with the present invention;

FIG. 10 is a cross-sectional view of a TFT array substrate used for a MVA LCD panel in accordance with the present invention;

FIG. 11 is a cross-sectional view of a TFT array substrate used in a MVA LCD panel in accordance with the present invention;

FIG. 12 is a cross-sectional view of a TFT array substrate used in a MVA LCD panel in accordance with the present invention;

FIG. 13 is a cross-sectional view of a TFT array substrate used in a MVA LCD panel in accordance with the present invention;

FIG. 14 is a cross-sectional view of a TFT array substrate used in a MVA LCD panel in accordance with the present invention;

FIG. 61 illustrates a manufacturing flow of performing the photolithographic procedure for three times that uses a MVA TFT array substrate to apply a halftone exposure method for two times;

FIG. 62 illustrates a manufacturing flow of performing the photolithographic procedure for three times that uses a MVA TFT array substrate to apply a halftone exposure method for two times;

FIG. 63 illustrates a manufacturing flow of performing the photolithographic procedure for three times that uses an IPS TFT array substrate to apply a halftone exposure method for three times; and FIG. 64 illustrates a manufacturing flow of performing the photolithographic procedure for three times that uses an IPS TFT array substrate to apply a halftone exposure method for three times.

DETAILED DESCRIPTION OF THE PREFERRED EMBODIMENTS

To make it easier for our examiner to understand the objective, innovative features and performance of the present invention, we use a preferred embodiment and the accompanying drawings for a detailed description of the present invention.

Figure 1:
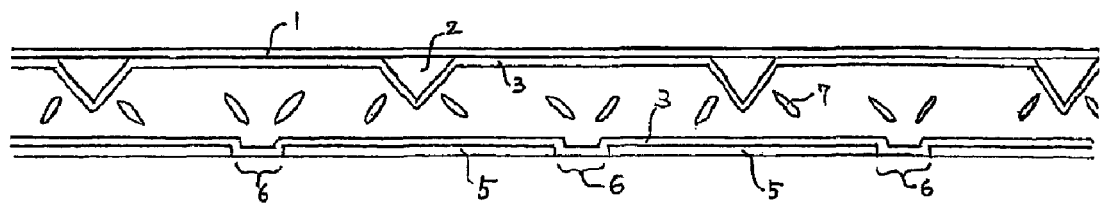
FIG. 1 is a cross-sectional view of a conventional MVA LCD panel.
Figure 2:
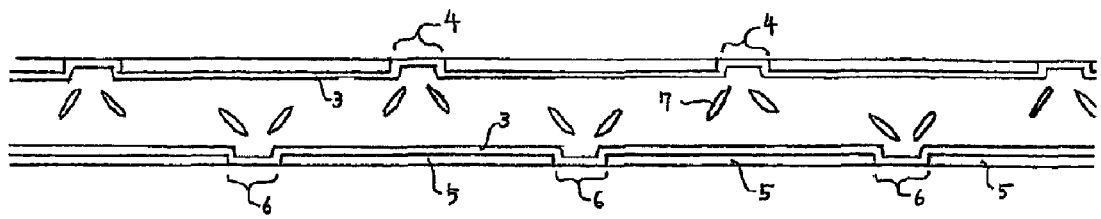
FIG. 2 is a cross-sectional view of a conventional MVA LCD panel.

Referring to FIGS. 1 and 2 for cross-sectional views of a current mainstream multi-domain vertical alignment liquid crystal display (MVA LCD) panel, a mechanism for controlling the direction of movements both is installed separately on upper and lower substrates to control the vertical alignment of anisotropic liquid crystal molecules of a negative dielectric constant, and an orientation control slit 4 disposed on a side of a substrate corresponding to a thin film transistor (TFT) for a liquid crystal alignment control. Because the discrimination line of an LCD using this method is constant without swinging, uneven display rarely occurs, and LCD panels with high quality of display can be produced as a good yield rate. Because the discrimination line position in a pixel is fixed without moving, uniform brightness is displayed in the LCD panel, and high quality LCD panels can be produced at a good yield rate. However, it is necessary to form a slit or a bump 2 disposed on a lateral side of a color filter (CF) substrate corresponding to a thin film transistor (TFT) substrate for the structure as shown in FIGS. 1 and 2 to control the liquid crystal alignment; thus, the production cost of the CF substrate is higher than that of the twisted nematic (TN) CF substrate. To lower the cost of the CF substrate, all liquid crystal alignment control functions are built in the TFT substrate side.

Referring to FIGS. 54 to 60 for an embodiment of a CF substrate 74 side having no alignment control function as disclosed in the previous patents, these CF substrates 74 cannot be used as large substrates. These previous disclosures can be used for small pixels only. Because an edge field effect of a pixel electrode 5 is used, these substrates are not appropriate for the large pixel electrodes used for the liquid crystal TV.

Figure 3:
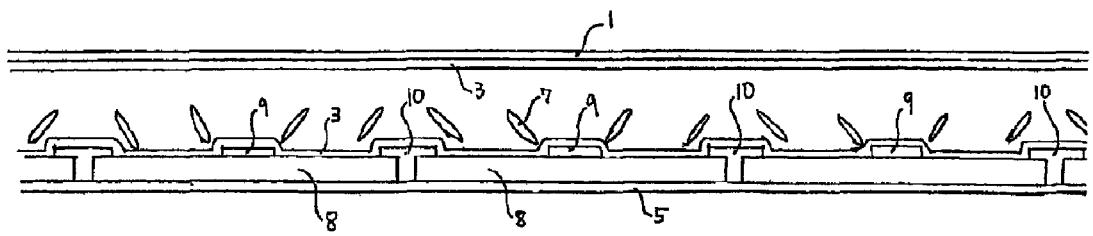
FIG. 3 is a cross-sectional view of a MVA LCD panel of the present invention.
Figure 4:
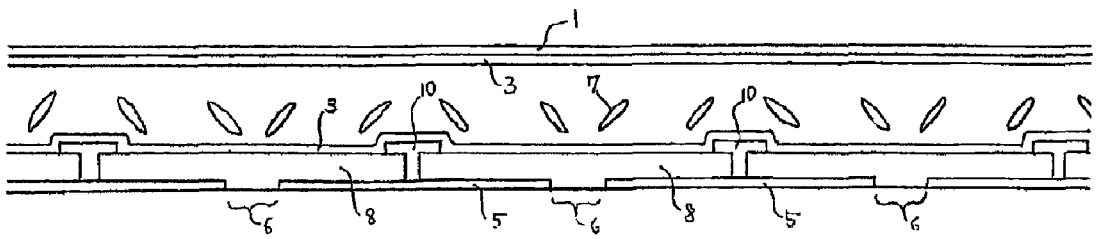
FIG. 4 is a cross-sectional view of a MVA LCD panel of the present invention.
Figure 5:
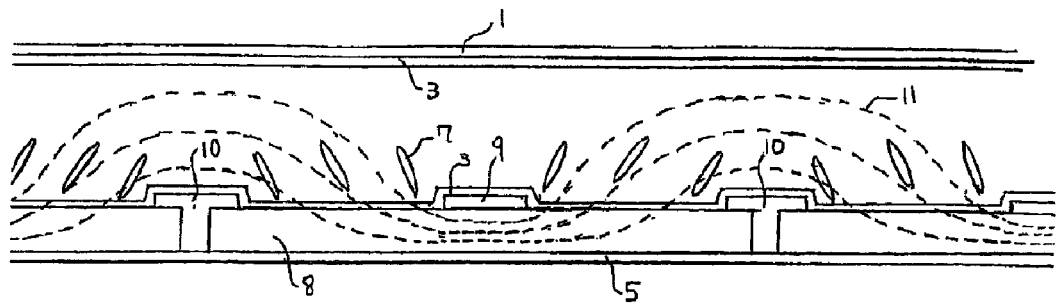
FIG. 5 is a schematic view of the principle of a MVA LCD panel of the present invention.
Figure 6:
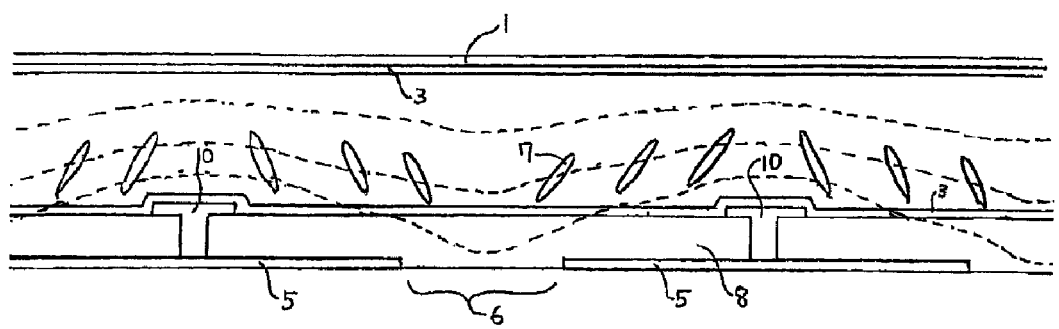
FIG. 6 is a schematic view of the principle of a MVA LCD panel of the present invention.

With the two basic structures shown in FIGS. 3 and 4, a TFT substrate side has all of the liquid crystal alignment control functions, including a vertical alignment film 3. In the TFT substrate side shown in FIG. 3, two different liquid crystal alignment control electrodes 9, 10 are installed between the common electrode of the substrate and correspond to the pixel electrode 5 to successfully form an equal-potential distribution 11 as shown in FIG. 5. Alignment control electrode 10 of FIG. 4 is installed on a pixel electrode 5 at the TFT substrate side and between the slit for alignment control 6, and the pixel electrode 5 corresponds to a common electrode of the substrate to successfully form an equal-potential distribution 11 as shown in FIG. 6. Even for a structure as shown in FIG. 7, instead of the structure as shown in FIG. 6, the similar equal-potential distribution 11 can be formed successfully.

Figure 7:
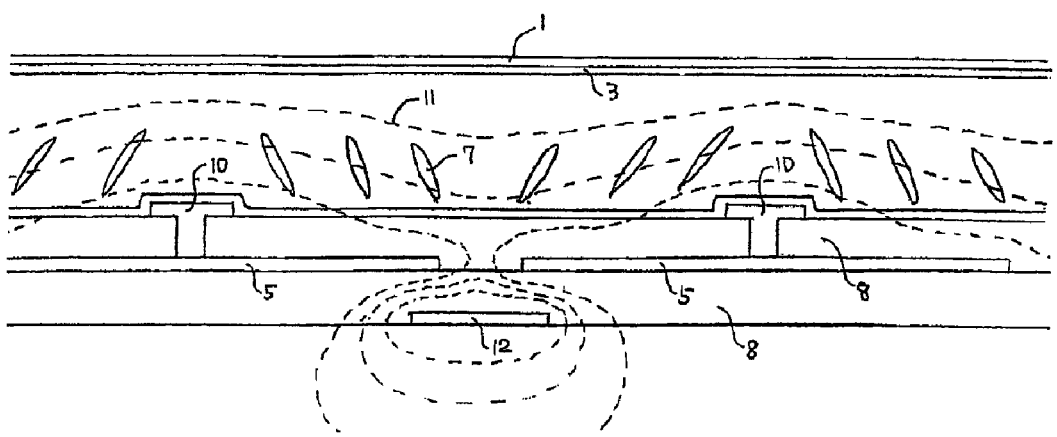
FIG. 7 is a schematic view of the principle of a MVA LCD panel of the present invention.

In FIGS. 5-7, a common electrode is located facing to the liquid crystal alignment control electrode 9. The closer the distance from the common electrode to the liquid crystal alignment control electrode 9, the more similar the equal potential distribution diagram 11 of FIGS. 5-7 will be. This is because the liquid crystal alignment control electrode 9 of FIG. 5 is not connected to the pixel electrode 5 which is connected to the common electrode. Also disclosed in FIG. 7, an orientation control electrode 12 disposed under the orientation control slit of the pixel electrode.

If a cell gap is greater than 5 μm, the structure of a pixel electrode 5 of a TFT substrate connected to the liquid crystal alignment control electrode 10 in accordance with the present invention almost has no effect. However, if the cell gap is below 3 μm, the effect is significant. If the cell gap is below 2.5 μm, a sufficiently equal-potential distribution diagram 11 is formed for controlling the alignment of liquid crystal molecules.

Figure 15:
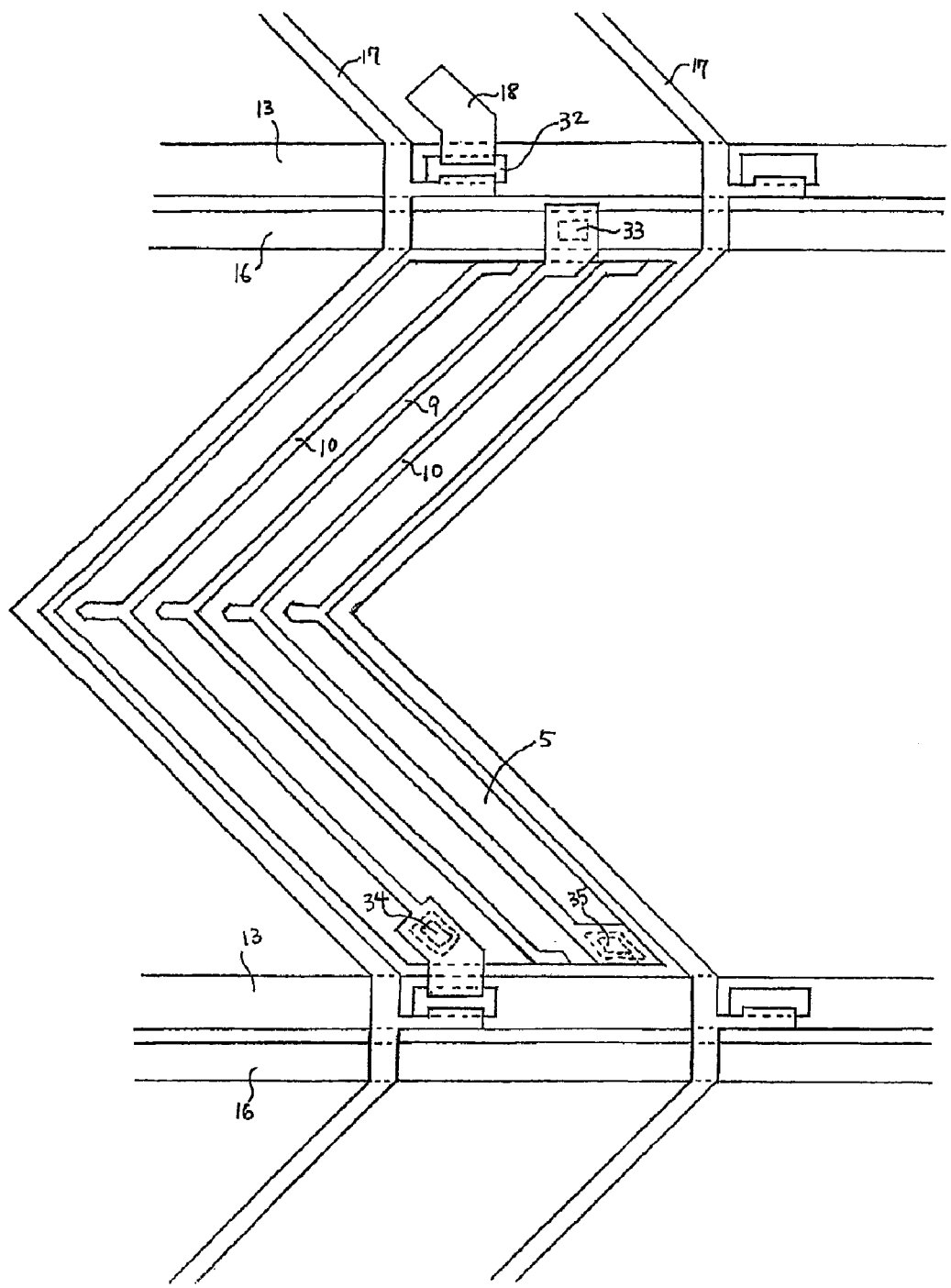
FIG. 15 is a planar view of a TFT array substrate used in a MVA LCD panel in accordance with the present invention.
Figure 17:
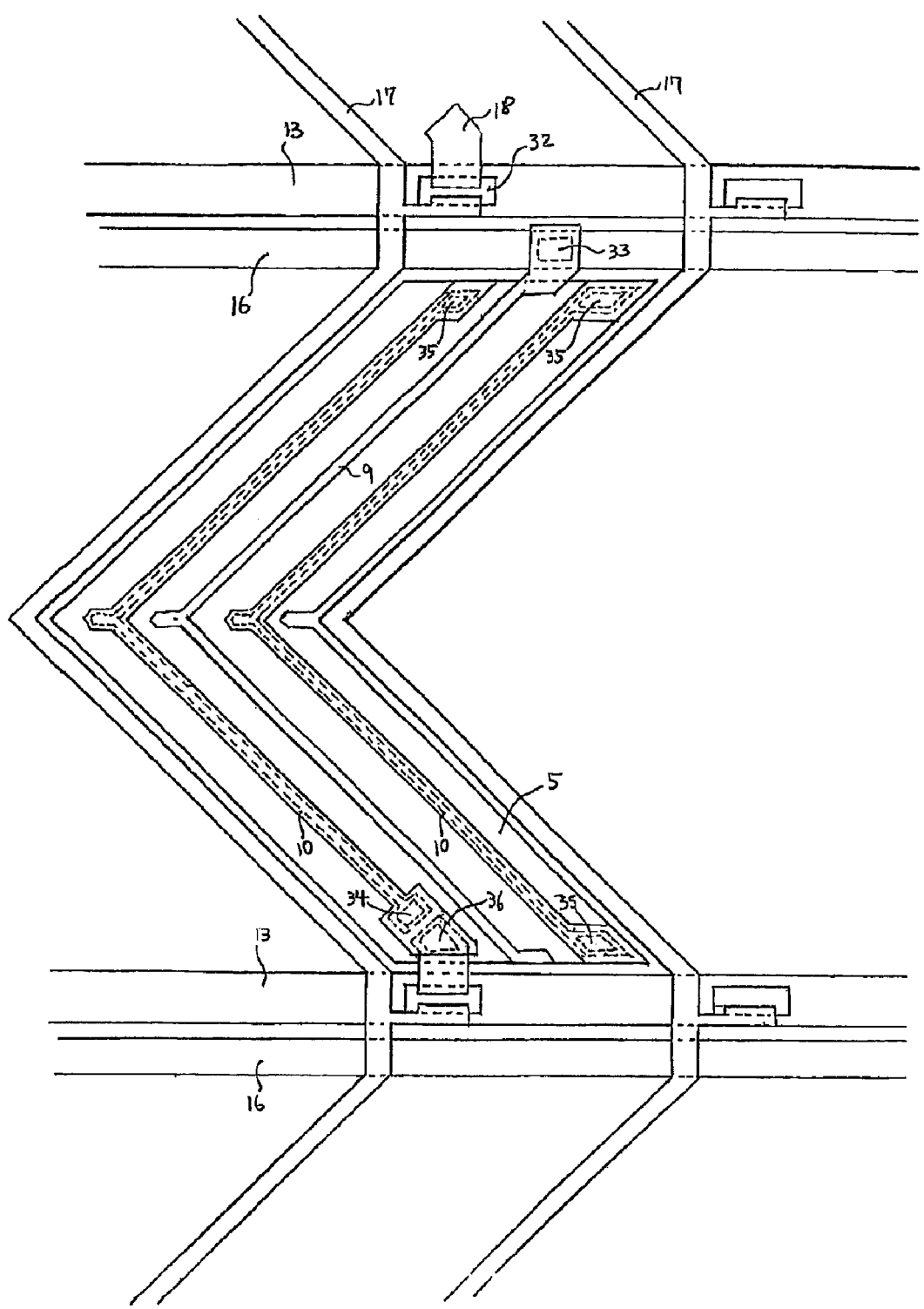
FIG. 17 is a planar view of a TFT array substrate used in a MVA LCD panel in accordance with the present invention.
Figure 38:
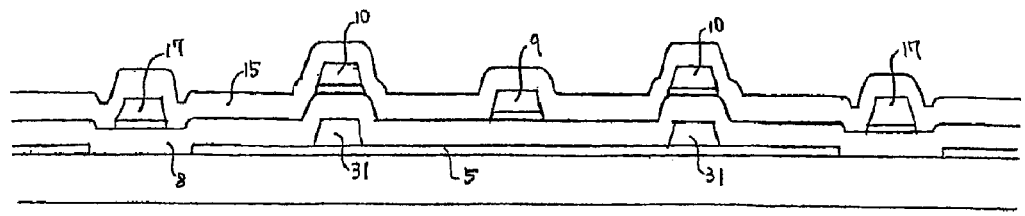
FIG. 38 is a cross-sectional view of a basic unit pixel of a TFT array substrate of a MVA LCD panel in accordance with the present invention.
Figure 40:
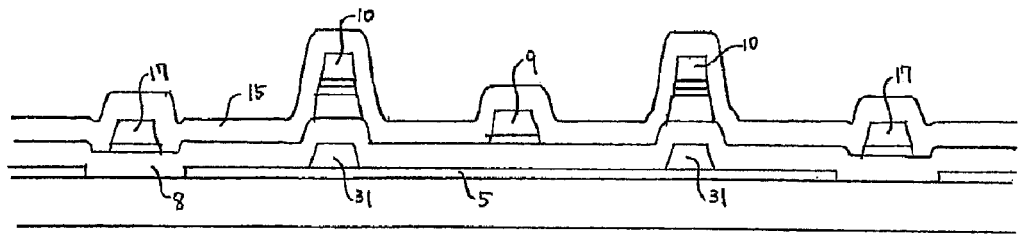
FIG. 40 is a cross-sectional view of a basic unit pixel of a TFT array substrate of a MVA LCD panel in accordance with the present invention.

Referring to FIGS. 15 and 17 for planar views of Embodiment 1 of a TFT substrate, two types of different alignment control electrodes 9, 10 are formed at an upper layer of a pixel electrode 5, and an alignment control electrode installed at the middle of a pixel is coupled to a gate electrode 13 and installed parallel with a common electrode 16. Another alignment control electrode with a different alignment control is passed and disposed at a contact pad 35 in the pixel electrode 5 and coupled to the pixel electrode 5. Referring to FIGS. 38 and 40 for a cross-sectional view of Embodiment 1 of the present invention, the height of alignment control electrode 10 of the pixel electrode 5 is increased to get closer to the common electrode 16 of the substrate as much as possible.

Figures 48, 49:
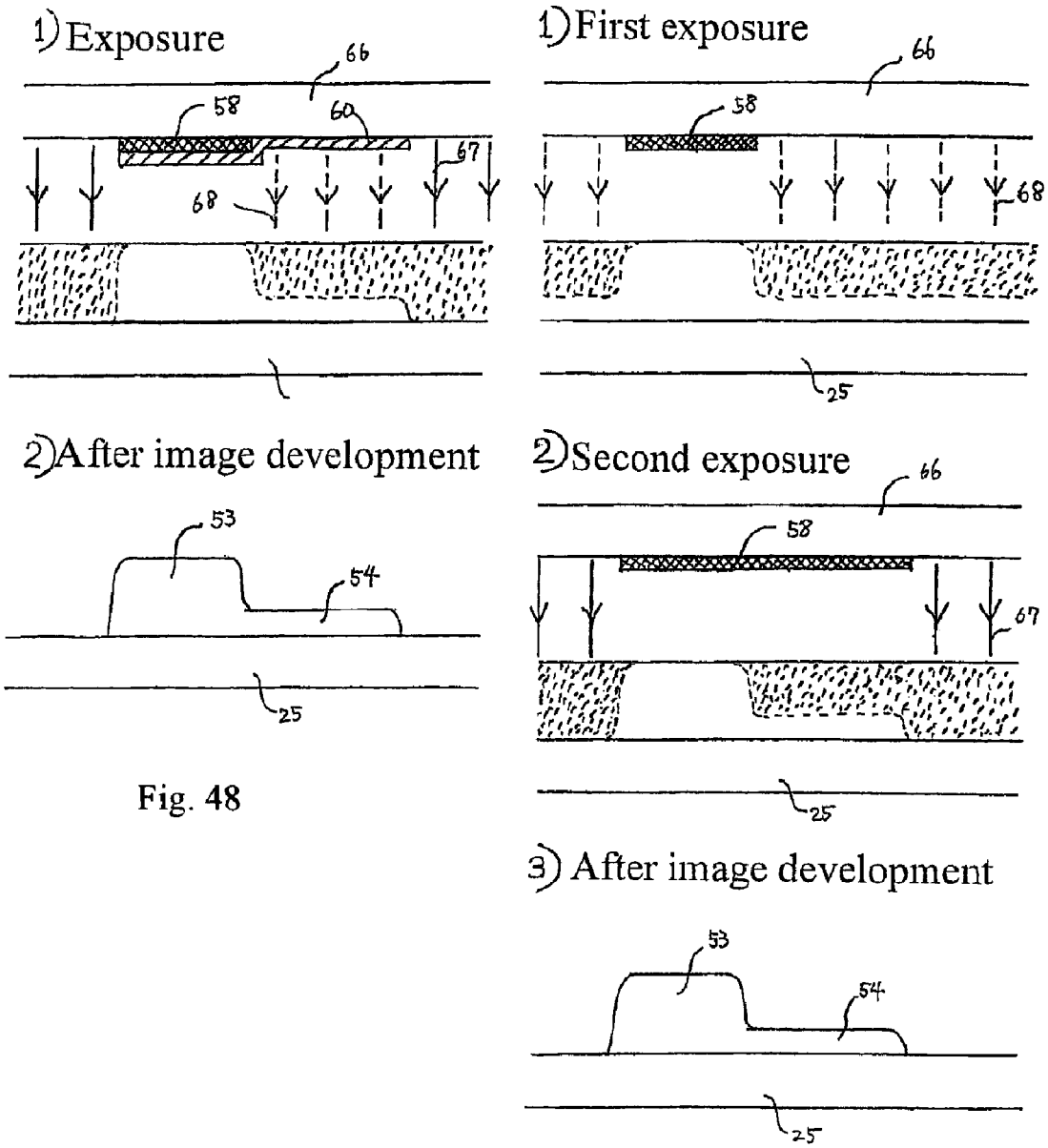
FIG. 48 illustrates a masking principle of a halftone exposure applied in the present invention.
FIG. 49 illustrates the principle of a halftone multiple exposure method applied in the present invention.

Referring to FIGS. 8, 9, 11, 13, 15, and 17, wherein FIG. 10 is a cross-sectional view of a MVA LCD panel adopting a TFT matrix substrate, FIG. 9 is a cross-sectional view of TFT array substrate used for a MVA LCD panel, and FIGS. 11 and 13, which are the partial cross-sectional view of the TFT array substrate used in the MVA LCD panel shown in FIGS. 15 and 17, respectively, in which the pixel electrode 5 must be installed at a lower layer to form a liquid crystal alignment control electrode at an upper layer of the pixel electrode 5 in accordance with the present invention. Therefore, its characteristic resides on the fact that the photolithographic procedure is used for producing a pixel electrode 5. FIG. 8 shows a process of using the photolithographic procedure for three times as depicted in FIG. 61. To shorten the manufacturing process, the present invention adopts a halftone exposure method, characterized in that an exposure method as shown in FIGS. 48 and 49 is used for producing two or more types of posiresist thicknesses 53, 54 after the image is developed.

Figure 18:
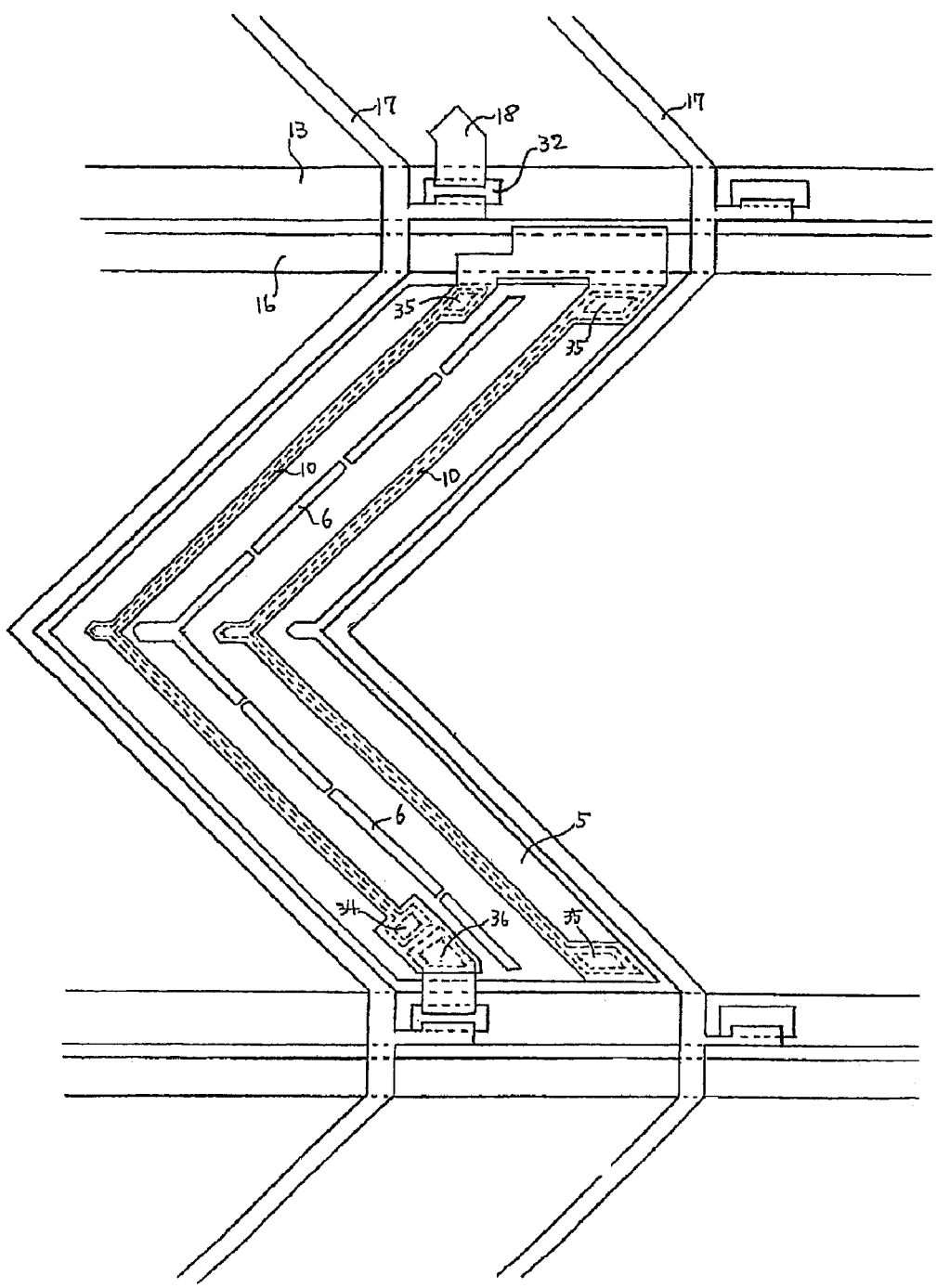
FIG. 18 is a planar view of a TFT array substrate used in a MVA LCD panel in accordance with the present invention.
Figure 19:
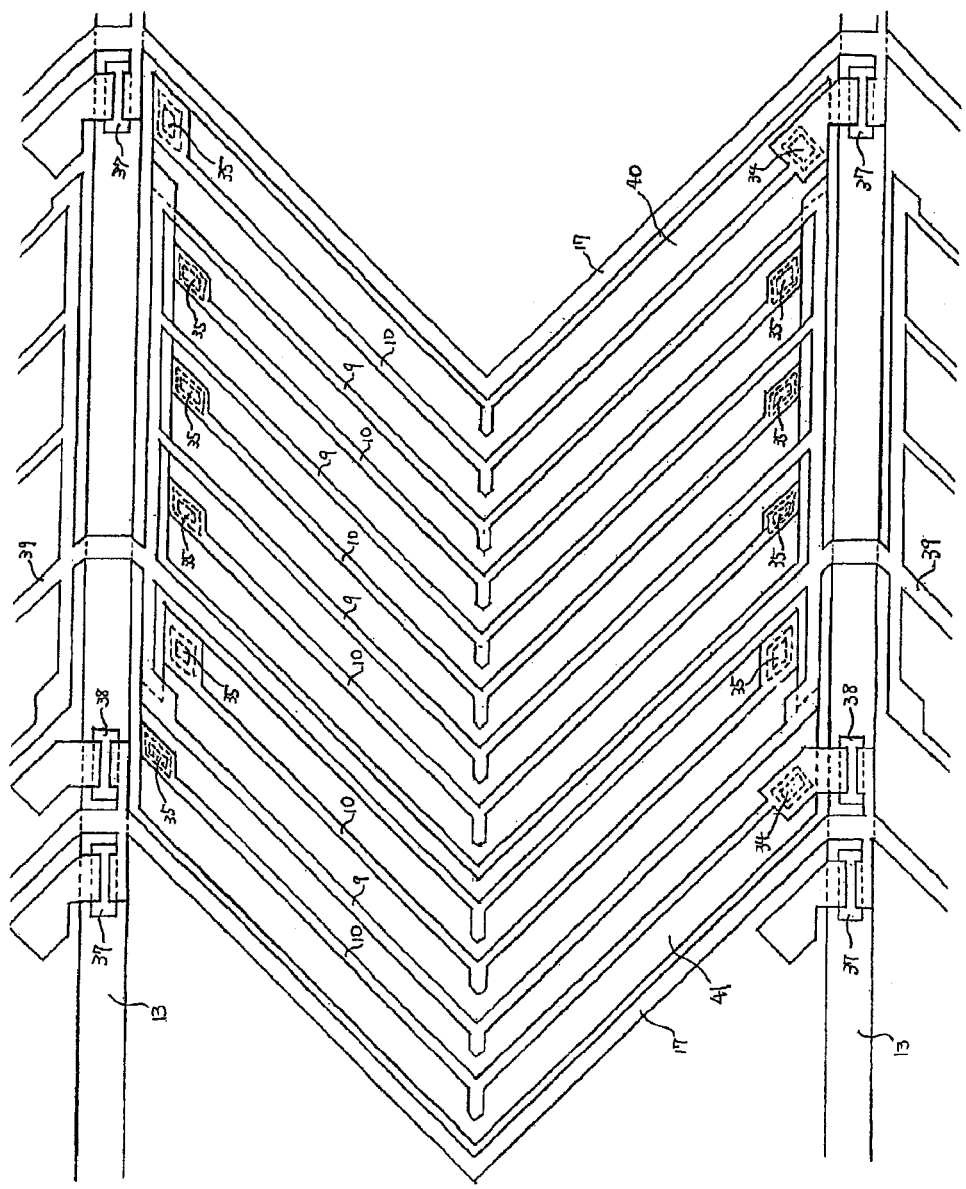
FIG. 19 is a planar view of a TFT array substrate used in a MVA LCD panel in accordance with the present invention.
Figure 20:
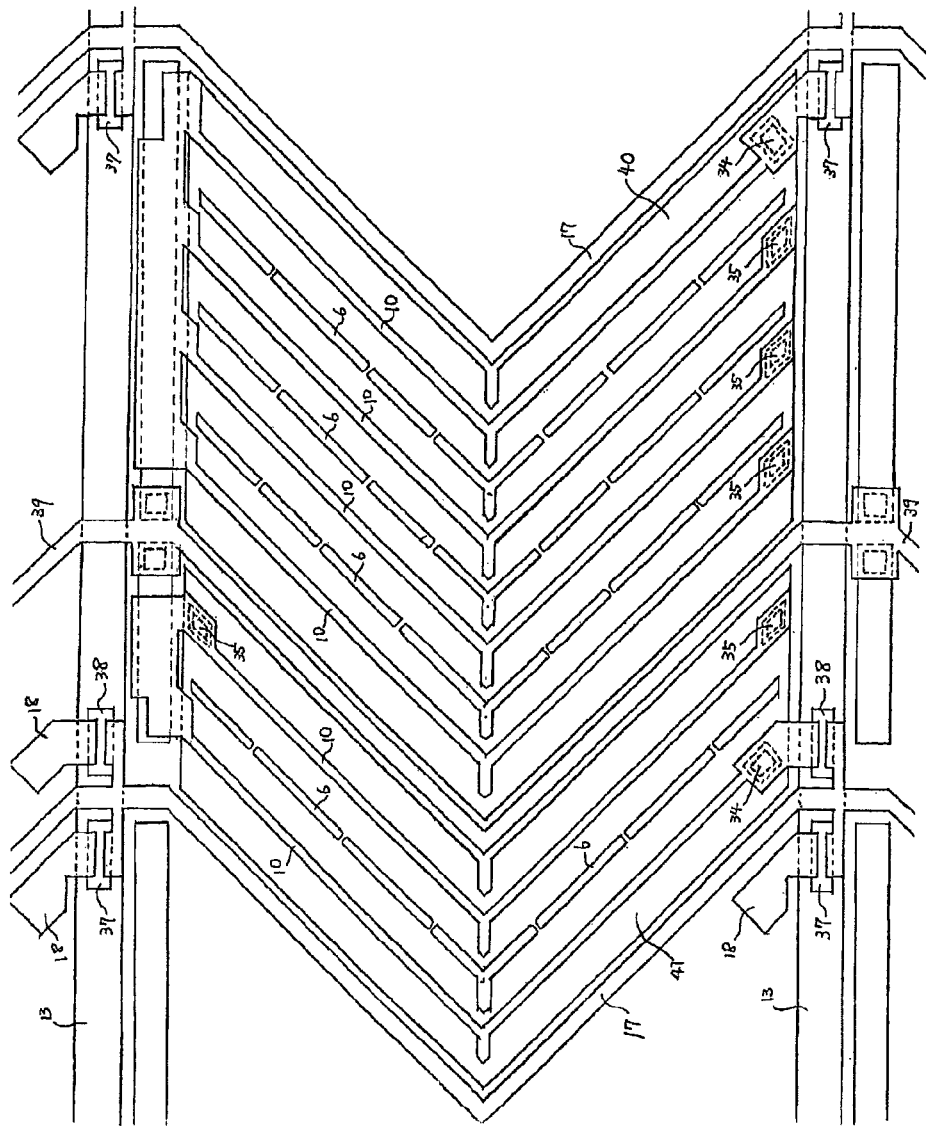
FIG. 20 is a planar view of a TFT array substrate used in a MVA LCD panel in accordance with the present invention.

FIGS. 8-12 also disclose a contact pad 22 disposed in the pixel electrode 5 for connection with the orientation control electrode 10, and a glass substrate 25; FIGS. 10 and 12 further show a contact pad 23 disposed in the pixel electrode 5 for connection with a capacitor electrode 24; FIGS. 13 and 14 show a pad electrode 31; FIGS. 15-18 show a thin film transistor 32, a contact hole 33 coupled to orientation control electrode 9 and common electrode 16, a contact hole 35 coupled to orientation control electrode 10 and contact pad disposed in the pixel electrode 5; FIG. 18 shows a contact hole 36 proximate the drain electrode 18; and FIGS. 19 and 20 shows a thin film transistor 37 for driving pixel electrodes 40 disposed in a large panel area and a thin film transistor 38 for driving pixel electrodes 41 disposed in a small panel area.

Figure 42:
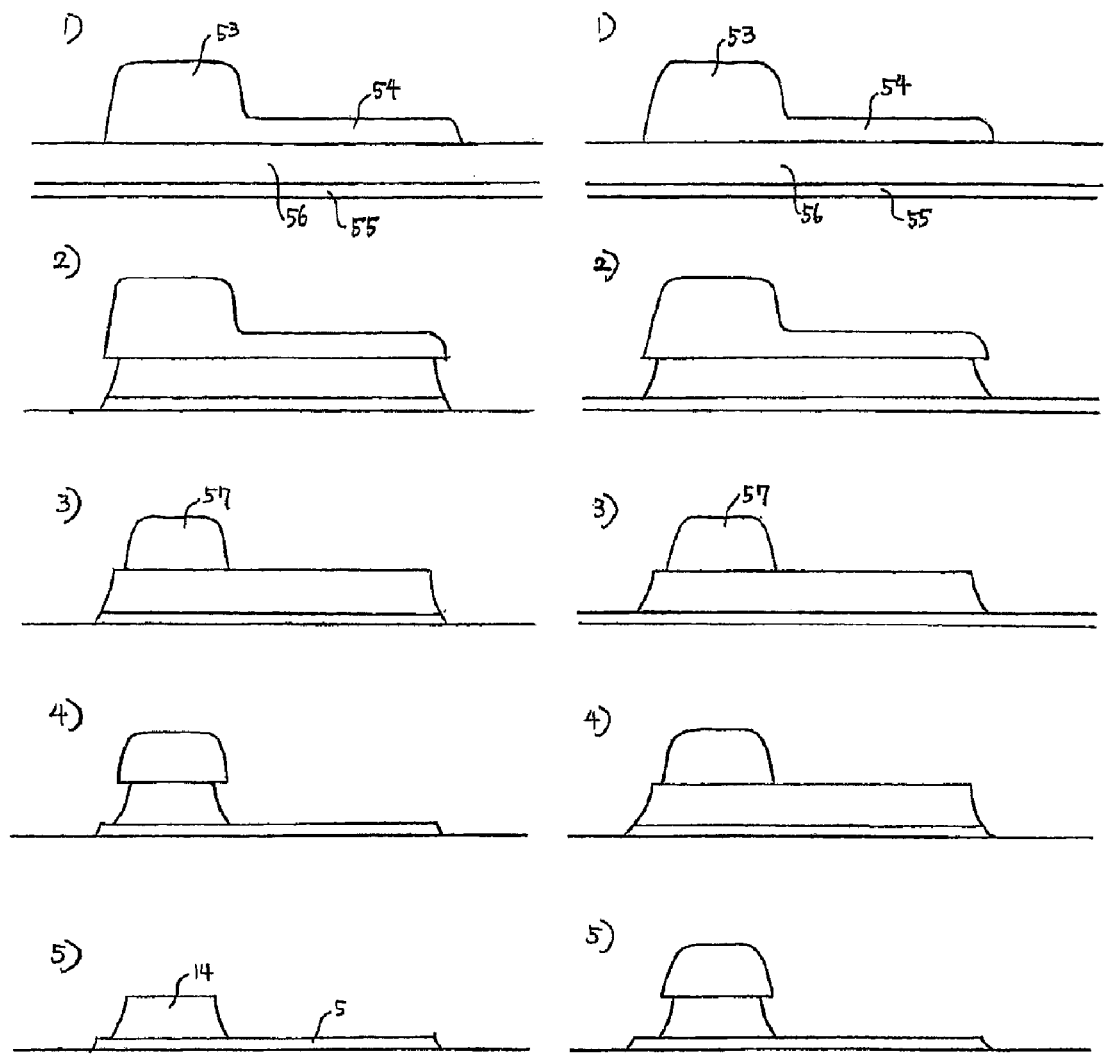
FIG. 42 is a cross-sectional view of a manufacturing flow that adopts a halftone exposure method to form a contact pad for a pixel electrode in accordance with the present invention.
Figure 43:
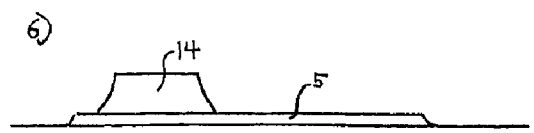
FIG. 43 is a cross-sectional view of a manufacturing flow that adopts a halftone exposure method to form a contact pad for a pixel electrode in accordance with the present invention.

In the first of the three times of photolithographic procedure as shown in FIG. 61, a gate electrode 13, a pixel electrode 5, a common electrode 16 and a contact pad 14 in a pixel electrode 5 are formed. In the first procedure, two manufacturing processes exist as shown in FIGS. 42 and 43, and either one of the two manufacturing processes can be used for forming the pixel electrode 5, but it is preferable to select a shorter process as shown in FIG. 42. If the thickness of the alignment control electrode as shown in FIG. 9 is reduced, and the halftone exposure method is used in the third time photolithographic procedure, it is preferable to select the process as shown in FIG. 43.

An aluminum alloy is used for making a scan line 13 (or a gate electrode) in this invention; therefore, ITO (Indium Tin Oxide) cannot be used in the pixel electrode 5 because a partial battery reaction will result, and the abnormal corrosion or ITO blackening issues usually occur. As a result, the pixel electrode 5 is generally a transparent electrode made of a thin film oxide such as titanium nitride or zirconium nitride.

Figure 51:
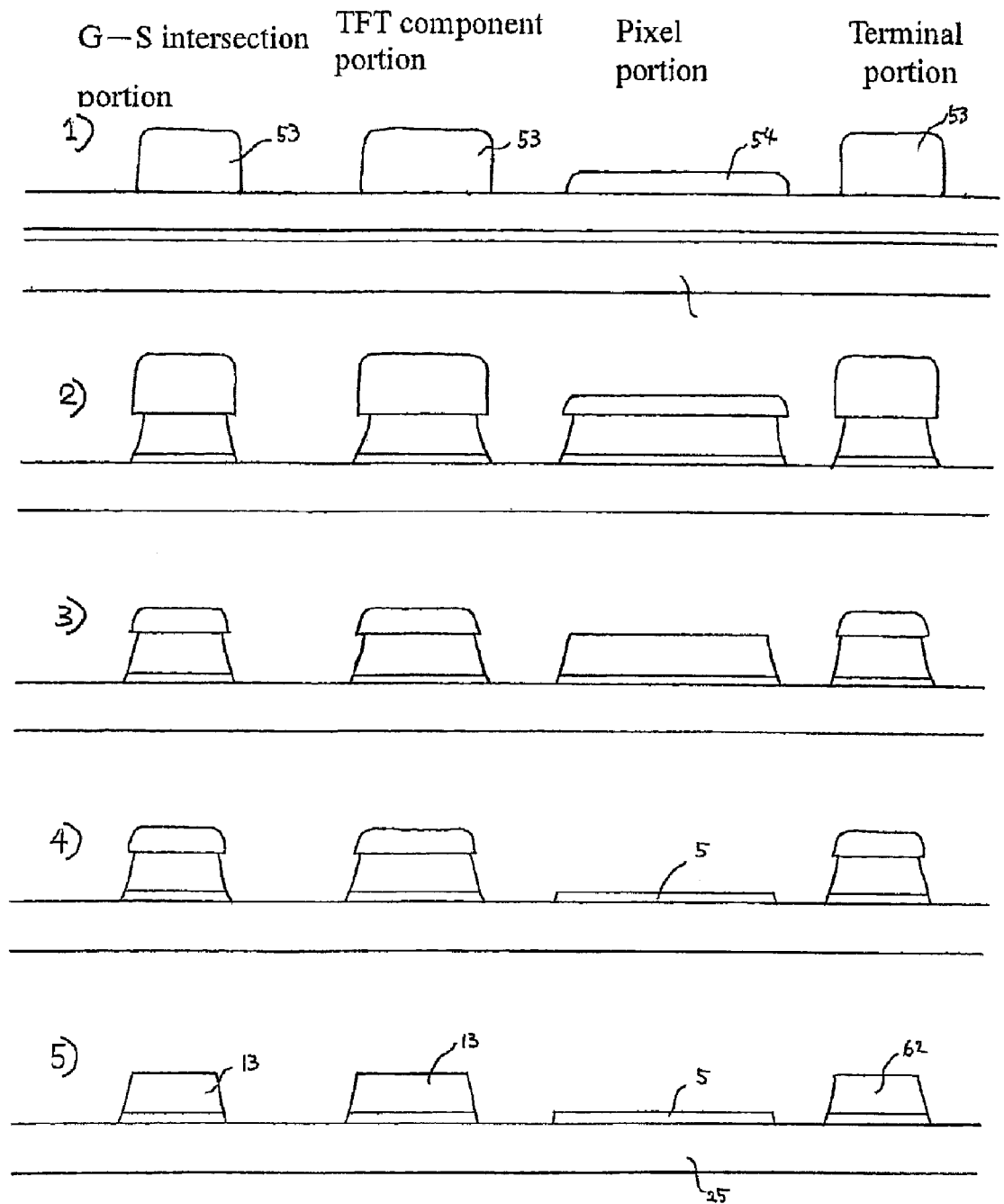
FIG. 51 is a cross-sectional view of a manufacturing flow of using a halftone exposure method to form a scan line portion, a pixel electrode and a terminal portion of a thin film transistor substrate in accordance with the present invention.
Figure 52:
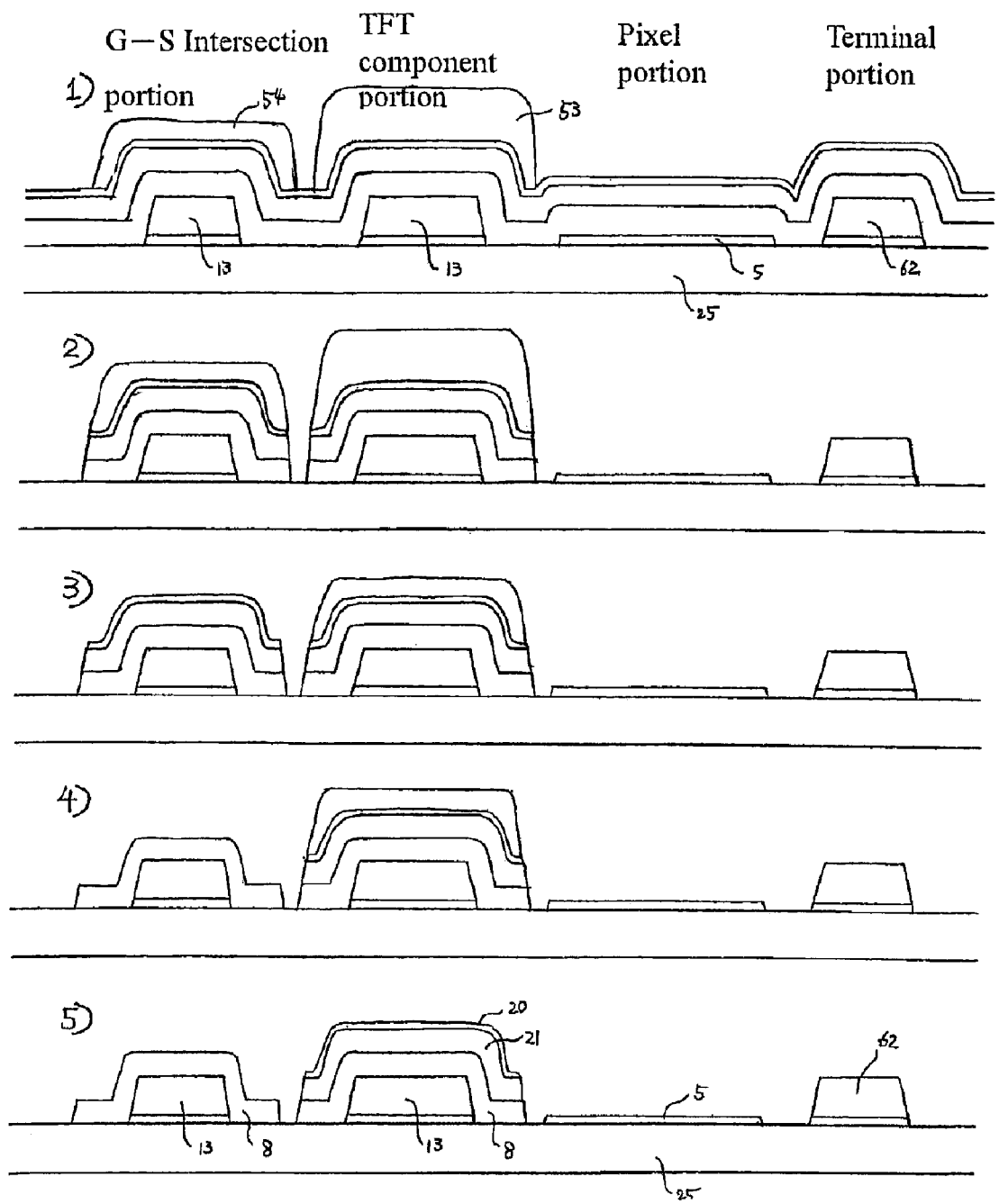
FIG. 52 shows a cross-sectional view of a manufacturing flow of using a halftone exposure method to give an island effect to a semiconductor layer of a thin film transistor component and expose a pixel electrode and a terminal portion completely.
Figure 53:
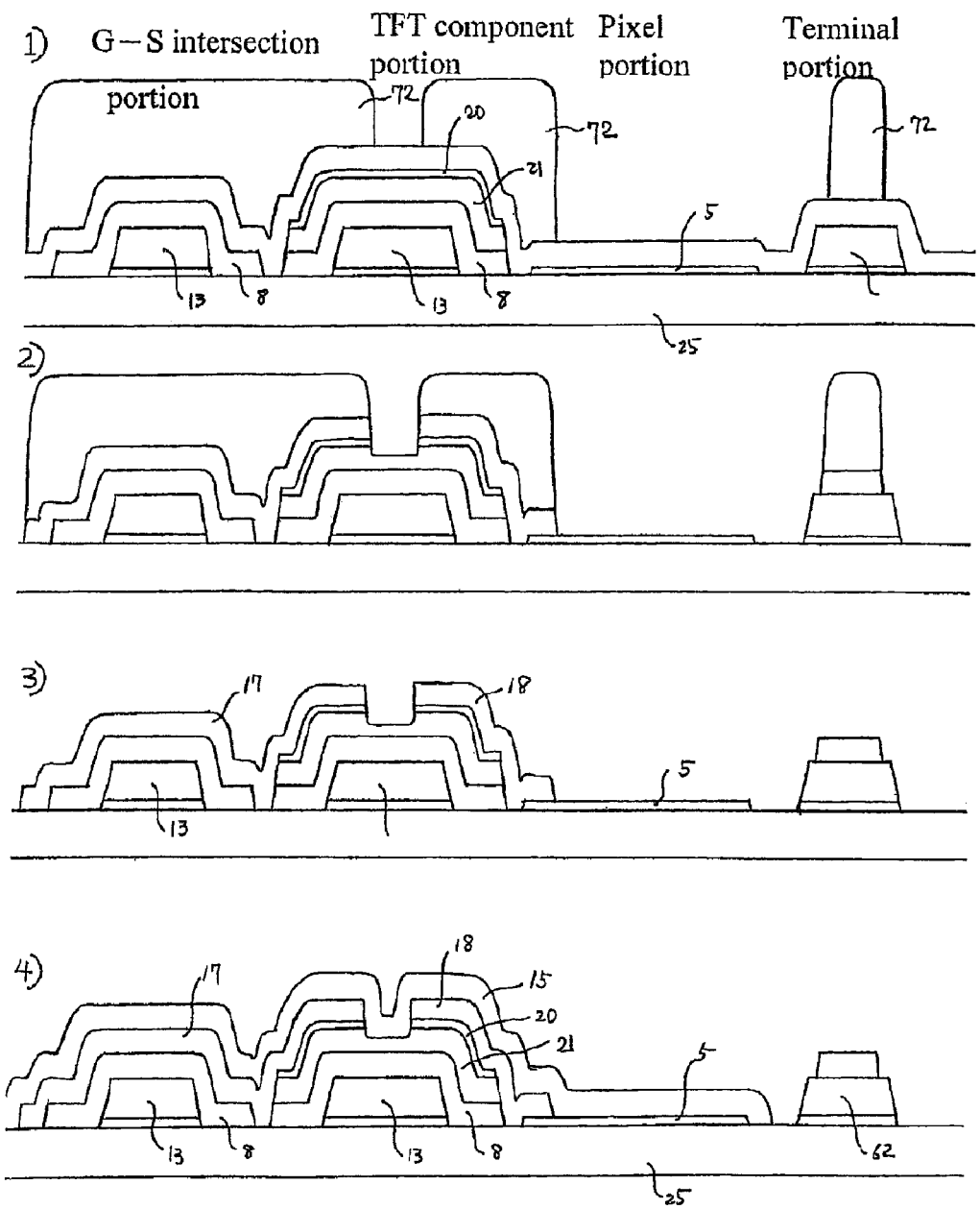
FIG. 53 shows a cross-sectional view of a manufacturing flow before forming a source electrode and a drain electrode in the process of manufacturing a thin film transistor component as illustrated in FIGS. 52 and 53.

The nitride of the transparent pixel electrode and the P—SiNxo of the gate insulating film 8 cannot have a large selectivity for creating a contact hole 34 by a dry etching method, and the manufacturing processes of the previous embodiments as shown in FIGS. 51 to 53 cannot be used anymore. To solve this problem, the present invention uses an aluminum alloy series contact pad to solve the aforementioned problem.

Figure 44:
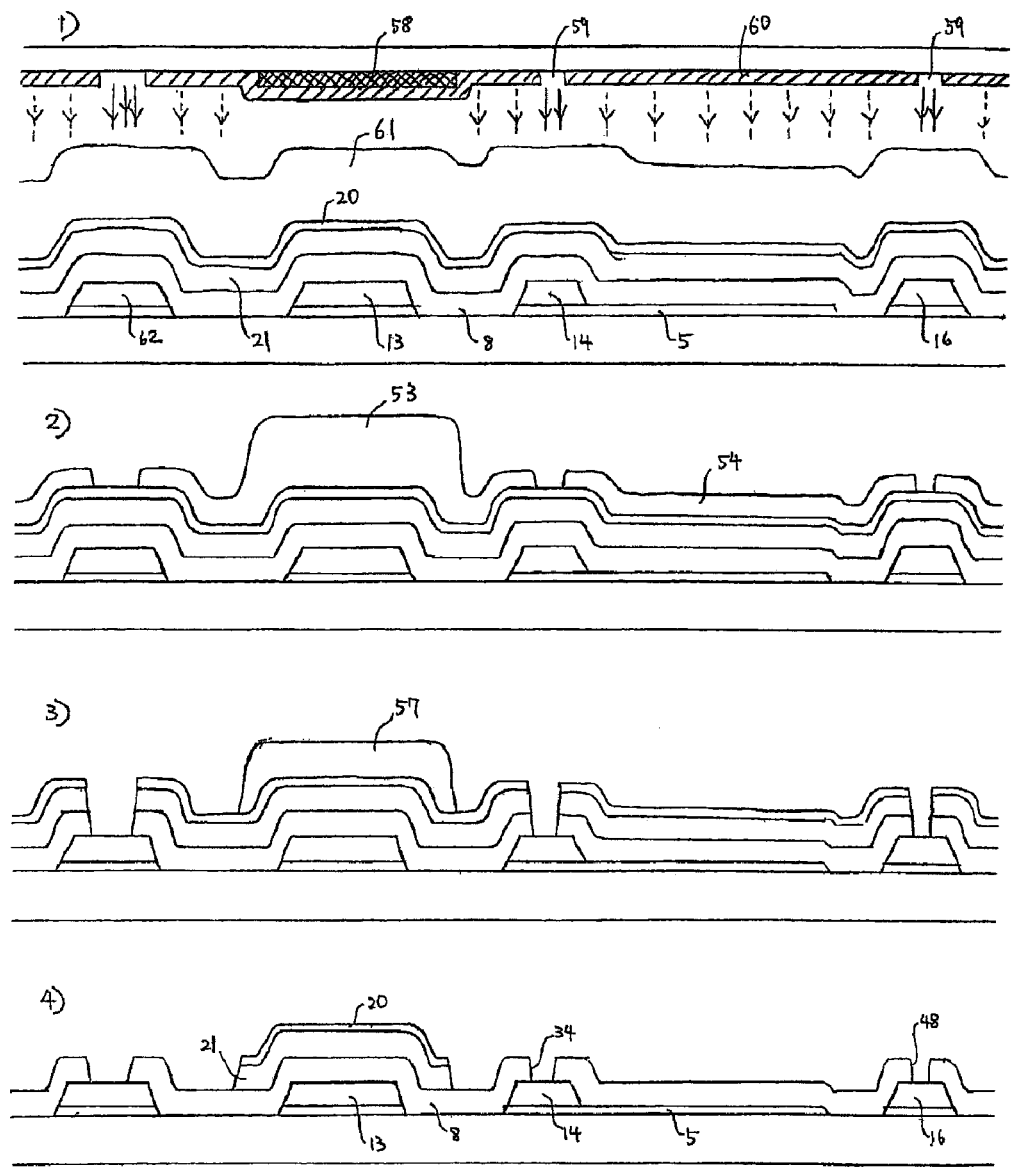
FIG. 44 is a cross-sectional view of a manufacturing flow that adopts a halftone exposure method to give an island effect to a semiconductor layer of a thin film transistor component and form a contact hole in accordance with the present invention.
Figure 46:
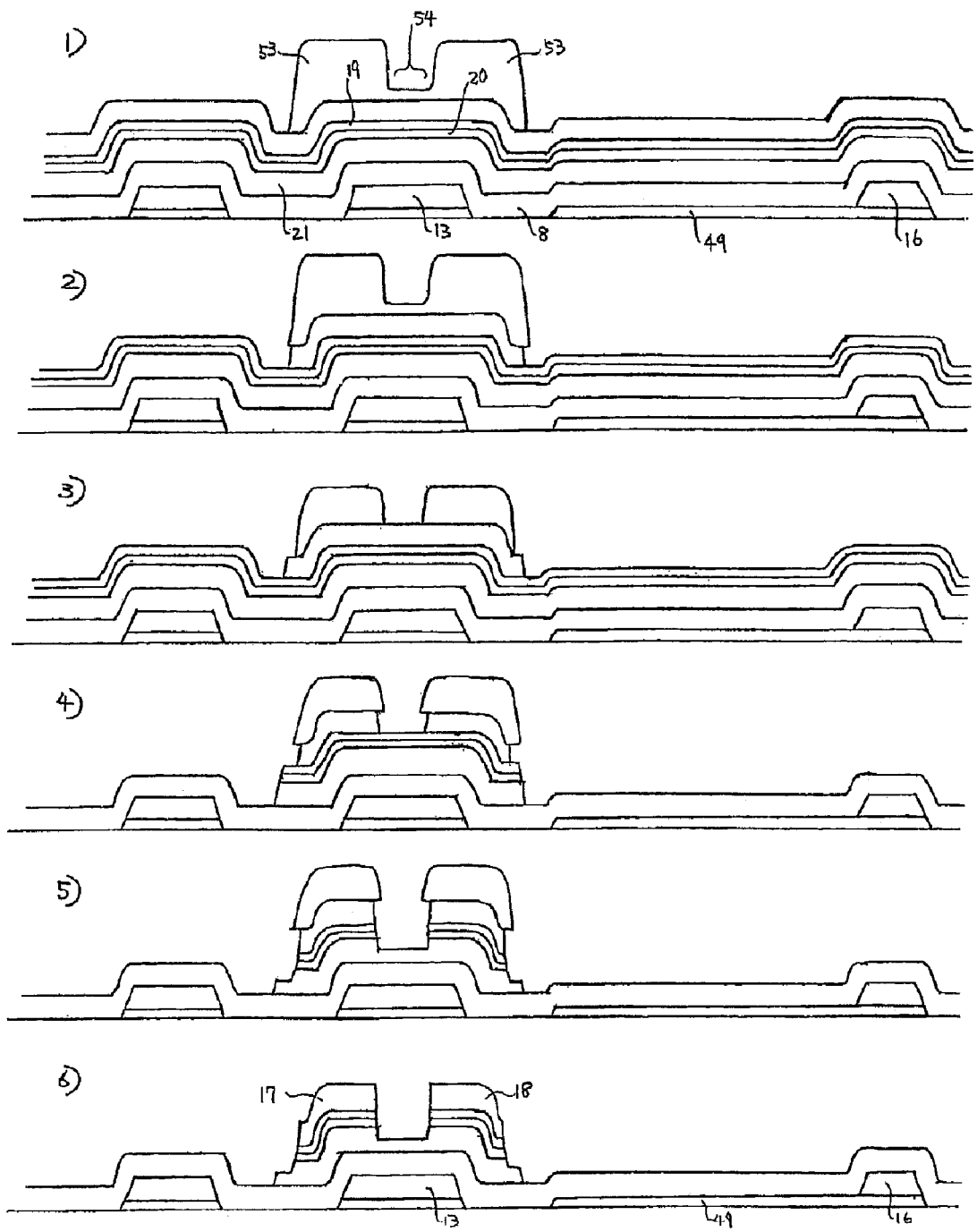
FIG. 46 is a cross-sectional view of a flow of manufacturing a thin film transistor substrate by a halftone exposure method in accordance with the present invention.
Figure 50:
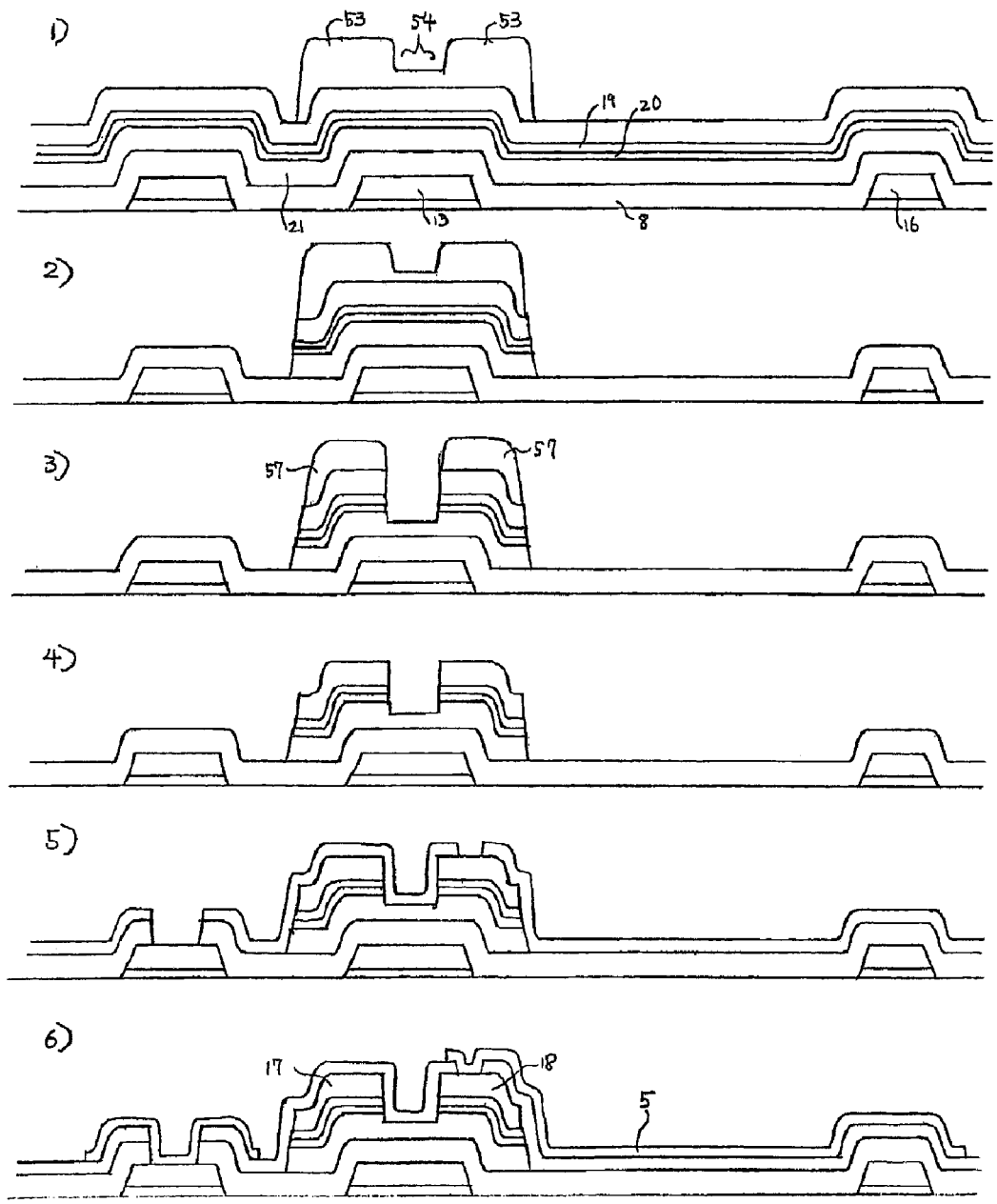
FIG. 50 is a cross-sectional view of a manufacturing flow of using a halftone exposure method to form a thin film transistor substrate in accordance with the present invention.

In the second time of the photolithographic procedure, the thin film semiconductor components are separated and the contact hole 34 is formed. This procedure is illustrated in FIG. 44. Because this procedure also adopts the halftone exposure method, the procedure of the first time can be used for performing two operations. The process adopted in FIGS. 11 and 17 is a halftone exposure process other than that adopted in FIG. 61, and the halftone exposure method as illustrated in FIG. 46 is used for separating the thin film semiconductor components while forming a source electrode 17 and a drain electrode 18. The halftone exposure process as shown in FIG. 46 is very similar to the halftone exposure process as shown in FIG. 50, but the halftone exposure process as shown in FIG. 46 is more difficult to take place. When a positive photo-resist layer at a thin area 54 is removed by an oxygen plasma method in the foregoing embodiment, as shown in FIG. 50, sidewalls of a thin film semiconductor layer 21 are oxidized, and the oxidization takes place easily at the time of removing an ohmic contact layer 20 (n+a-silicon layer) of a channel portion of the thin film transistor component, but an even removal cannot be achieved. In the situation, as shown in FIG. 46, the thin film semiconductor layer 21 is protected by a metal barrier 19 layer completely when the positive photoresist layer at the thin area 54 is removed by the oxygen plasma method, and thus the oxidization almost will not take place at the sidewalls.

Figure 47A:
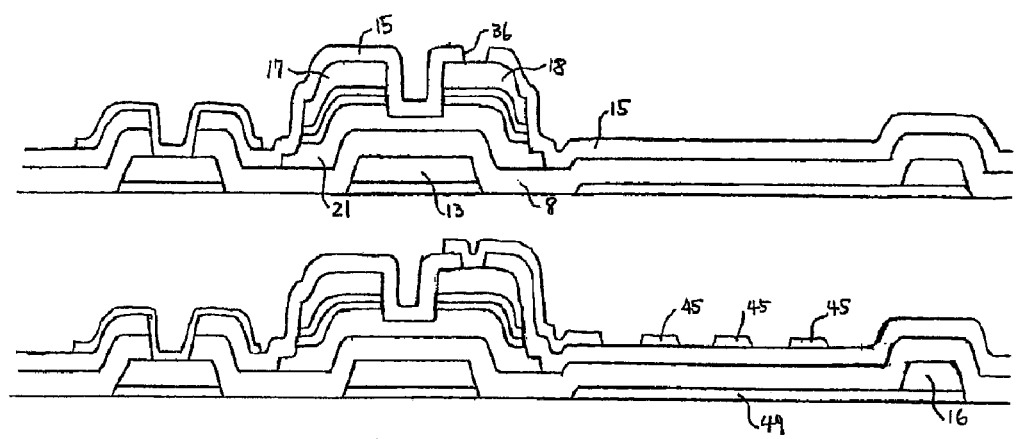
FIG. 47A illustrates the structure of a horizontal electric field active matrix substrate at a center pixel common electrode of the center of a basic unit pixel.
Figure 47B:
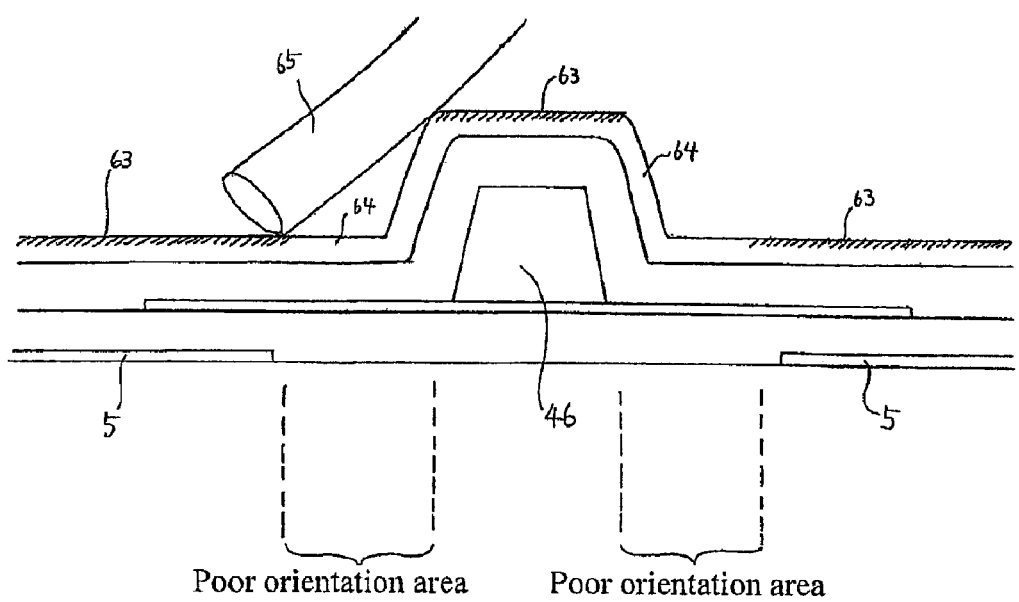
FIG. 47B illustrates the structure of a horizontal electric field active matrix substrate showing a poor orientation area.

FIGS. 42 and 43 also show a transparent electrode layer 55, a low resistance electrode layer 56 for wiring, and a residual posiresist 57 after oxygen plasma ashing; FIG. 44 shows a mask 58 for halftone exposure, a mask 59 for halftone exposure, a mask 60 for halftone exposure, a posiresist for halftone exposure 61, and a connection terminal portion 62 for external circuit; FIG. 47B shows an area 63 with fine rubbing procedure of the orientation film, an area 64 with worse rubbing procedure of the orientation film, and a fiber 65 for rubbing procedure; and FIGS. 48 and 49 show a glass 66 for shielding, a ray 67 in a complete exposure area, a ray 68 in a non-complete exposure area.

Figure 45:
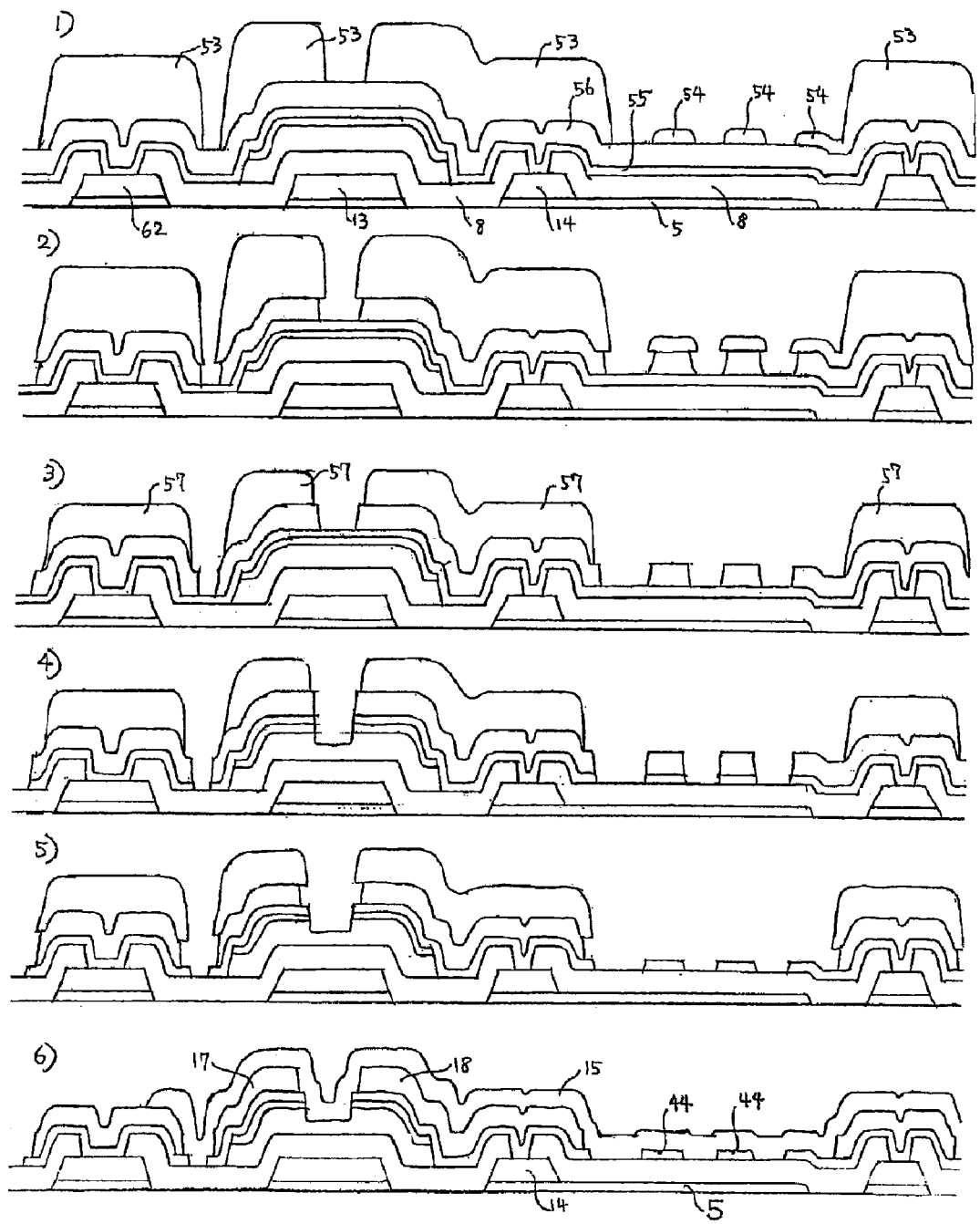
FIG. 45 is a cross-sectional view of a manufacturing flow that forms a source electrode, a drain electrode, a terminal electrode, and comb common electrode in accordance with the present invention.

In the third photolithographic procedure as shown in FIG. 61, an exposure method is generally used for forming a source electrode 17, a drain electrode 18 and an alignment control electrode as shown in FIG. 8. In FIG. 9, the third photolithographic procedure also adopts a photolithographic procedure that uses a halftone exposure method as shown in FIG. 45.

In FIGS. 8, 9 and 13, the third photolithographic procedure is used for forming two different types of alignment control electrodes 9, 10 at an upper layer of the pixel electrode 5 through the insulating film 8. In FIG. 11, a fourth photolithographic procedure is used for forming two different types of alignment control electrodes 9, 10, such that an oblique direction of vertical alignment negative dielectric constant anisotropic liquid crystal molecules 7, as shown in FIGS. 3 and 5.

In FIGS. 8, 9 and 13, a passivation film 15 is a P—SiNx film formed partially by using a CVD method. An ink-jet printing method or a plate offset printing method is sued to coat a passivation film 15 made of an organic compound such as BCB. The shortcoming of the process shown in FIG. 11 resides on that a short circuit may occur easily at the common electrode 16 of the corresponding substrate when two different types of alignment control electrodes 9, 10 are formed on the passivation film 15.

Figure 16:
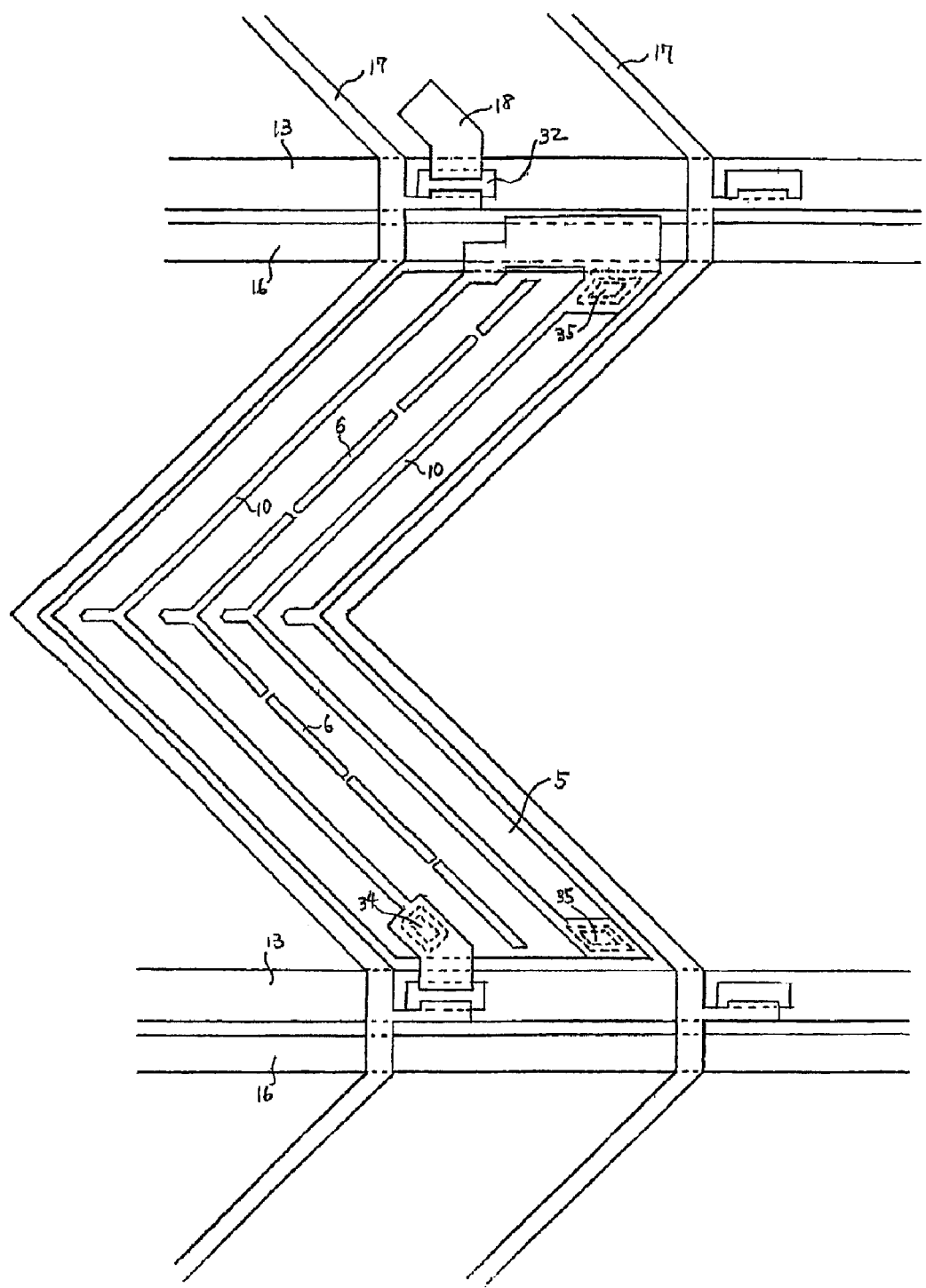
FIG. 16 is a planar view of a TFT array substrate used in a MVA LCD panel in accordance with the present invention.
Figure 39:
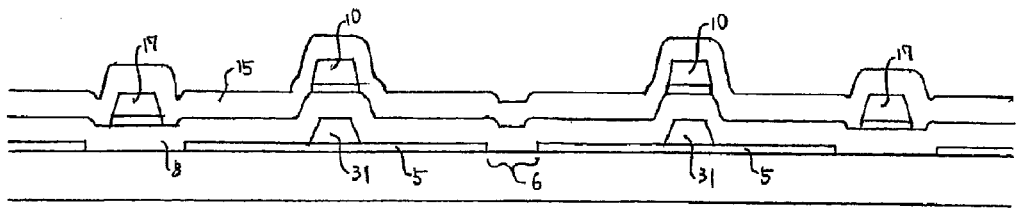
FIG. 39 is a cross-sectional view of a basic unit pixel of a TFT array substrate of a MVA LCD panel in accordance with the present invention.
Figure 41:
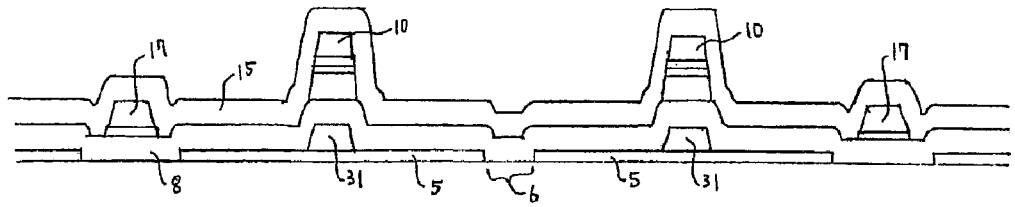
FIG. 41 is a cross-sectional view of a basic unit pixel of a TFT array substrate of a MVA LCD panel in accordance with the present invention.

Referring to FIGS. 16 and 18 for planar views of Embodiment 2 of TFT substrate in accordance with the present invention, a slit 6 is formed on the pixel electrode 5 for the alignment control, and a liquid crystal alignment control electrode 10 connected to the pixel electrode 5 is formed at an upper layer of the pixel electrode 5 through the insulating film 8. Referring to FIGS. 39 and 41 for cross-sectional views of Embodiment 2 of a pixel, Embodiment 2 similar to Embodiment 1 also installs the alignment control electrode 10 connected to the pixel electrode 5 at a position proximate to the substrate, and thus its characteristic resides on that each type of electrodes and semiconductor layers is installed at a lower layer of the alignment control electrode 10.

Embodiments 1 and 2 of the present invention include all alignment control functions at the TFT substrate side. Comparing Embodiment 1 with the previous methods as shown in FIGS. 1 and 2, the methods adopted by the present invention, as shown in FIGS. 3 and 4, also have the existing short-circuit problem at the same layer of a video signal line 17 while the alignment control electrode is being formed. Therefore, the pixel structures as shown in FIGS. 15 and 17 are avoided, and a structure having a curvature of 90 degrees at the center of the pixel is used instead. The video signal line 17 and the alignment control electrode of this structure are equidistantly arranged in parallel with each other, so as to reduce the chance of having a short circuit.

Figure 21:
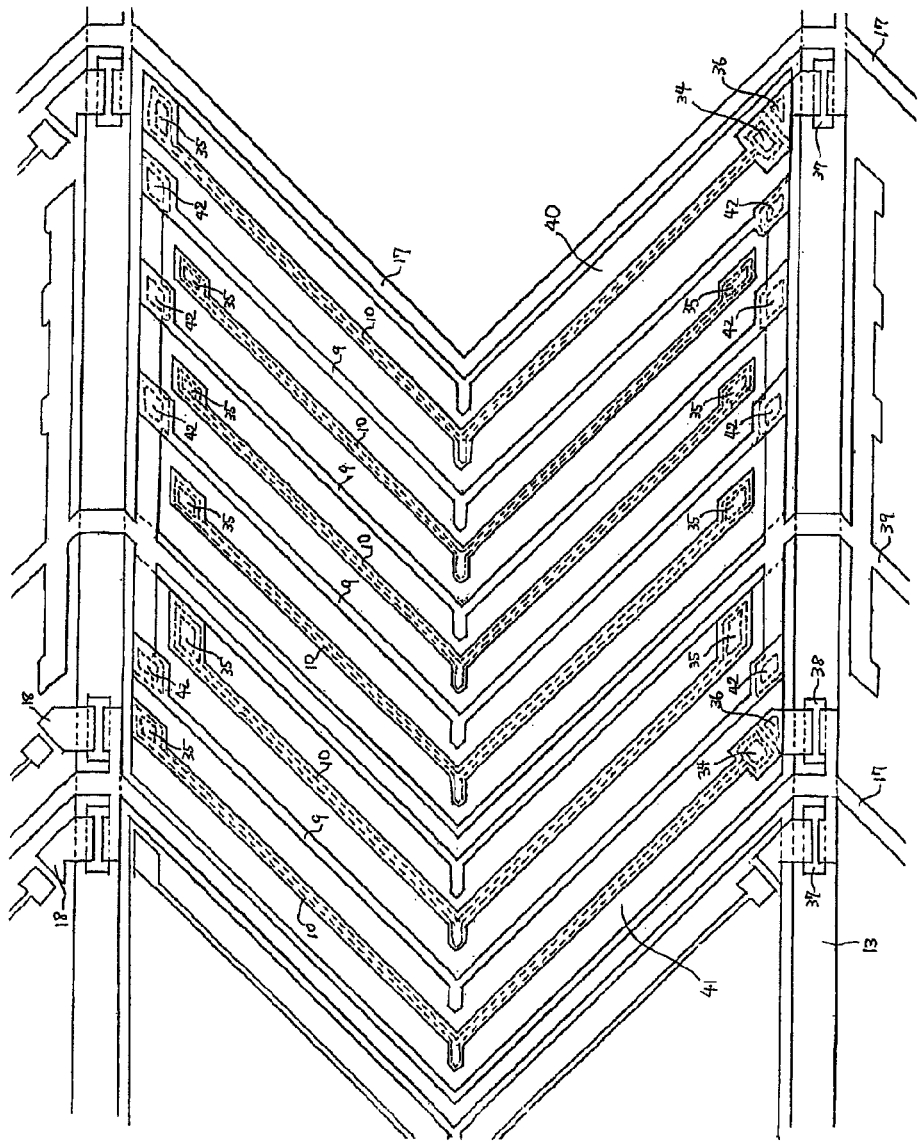
FIG. 21 is a planar view of a TFT array substrate used in a MVA LCD panel in accordance with the present invention.
Figure 22:
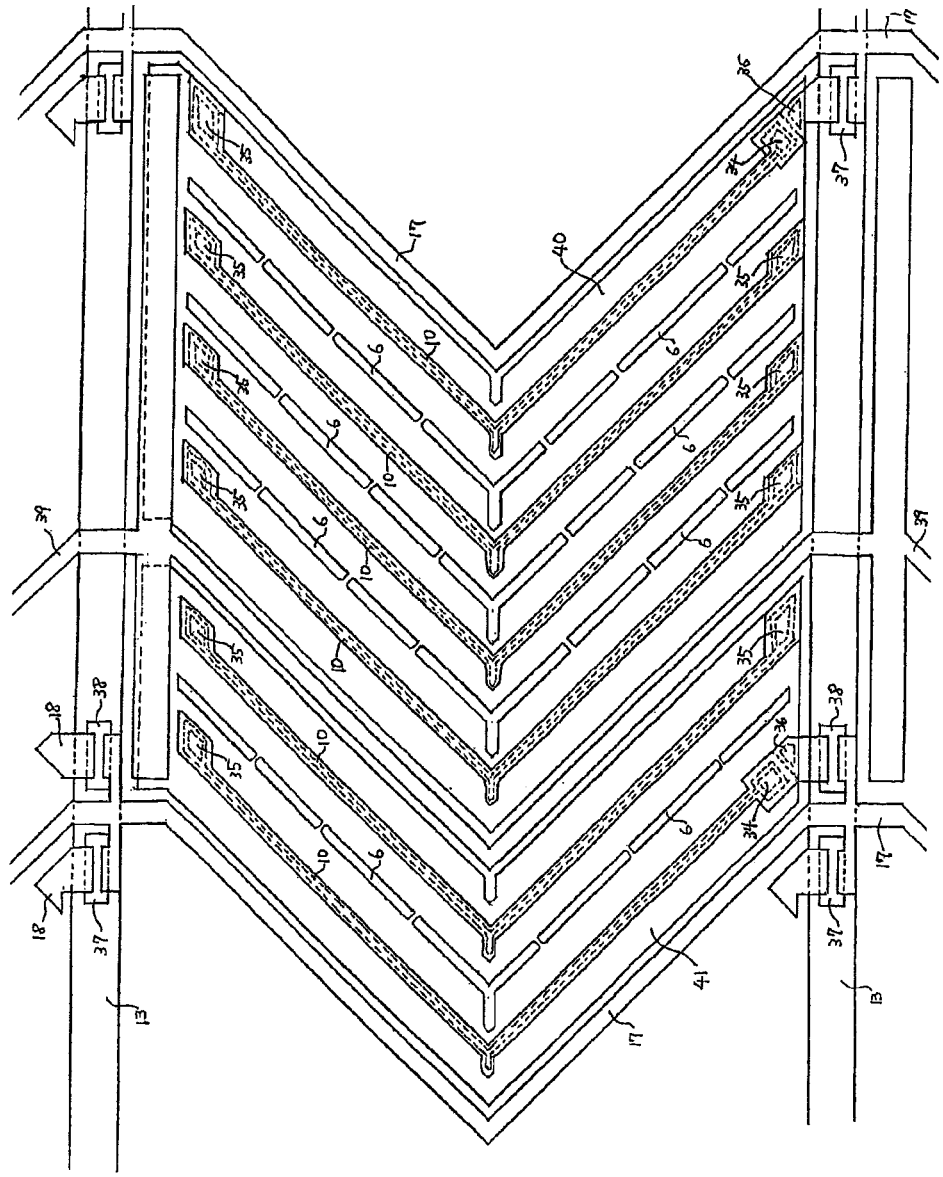
FIG. 22 is a planar view of a TFT array substrate used in a MVA LCD panel in accordance with the present invention.
Figure 23:
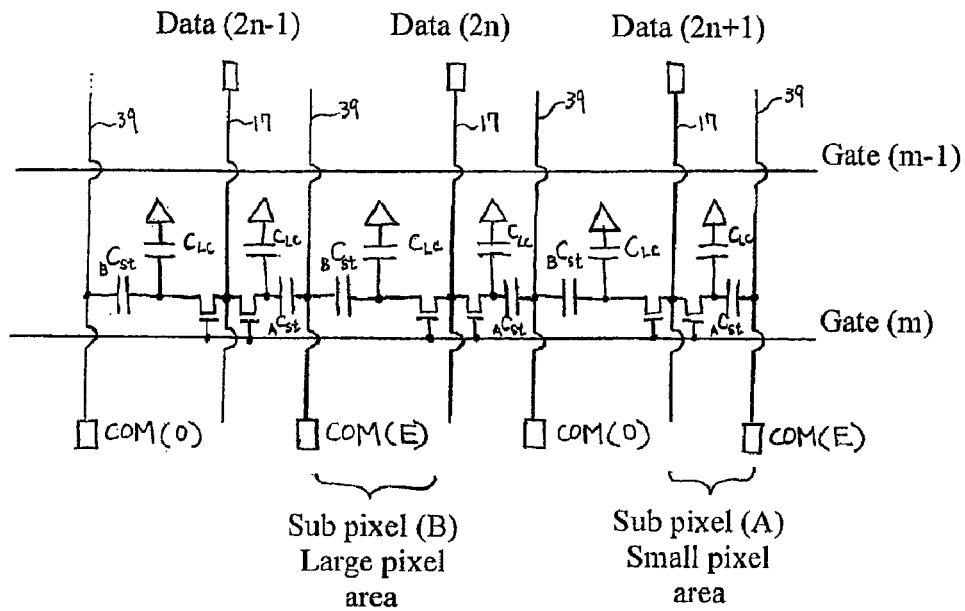
FIG. 23 shows a circuit model of a TFT array substrate of field-order driven MVA LCD panel in accordance with the present invention.
Figure 24:
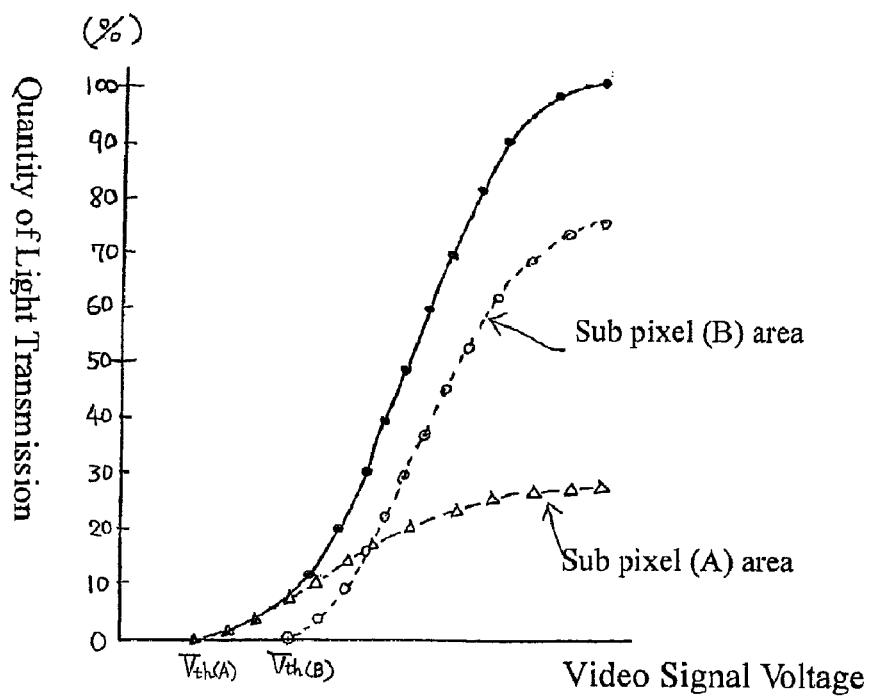
FIG. 24 shows a relation between the brightness and the signal voltage applied to a MVA LCD panel as depicted in FIG. 23.

Referring to FIGS. 10, 12, 14, 16, and 18, wherein FIG. 10 is a cross-sectional view of a TFT array substrate used for a MVA LCD panel, and FIGS. 12 and 14 that are partial cross-section views of the TFT portions as shown in FIGS. 16 and 18 respectively, the basic principle of the Embodiment 2 as illustrated in FIGS. 4 and 6 adopts an alignment control slit 6 for determining the oblique direction of the liquid crystal molecules correctly; however, Embodiment 2 cannot increase the strength of electric field as Embodiment 1 does. Therefore, the response rate of Embodiment 2 is slower than that of Embodiment 1. In the application of displaying animations, it is appropriate to adopt Embodiment 1 for the manufacture of LCD panels. From the planar views, as shown in FIGS. 15 and 17, many metal wires are installed densely on the same layer in Embodiment 1, and thus the existing short circuit problem may occur easily. In addition to the short-circuit issue, the voltage applied to the pixel electrode 5 of Embodiments 1 and 2 is not 100% applied to the liquid crystal layer, and thus the shortcoming of requiring a higher driving voltage as shown in FIGS. 1 and 2 still exists. Because the CF substrate 74 can use a low-cost CF substrate 74 which has about the same cost of TN, the product competitiveness can be improved. Particularly, the present invention provides a driving method of a field order driven the LCD panel that does not require a color filter as shown in FIGS. 3 and 4. Unlike the conventional method shown in FIGS. 1 and 2, the MVA LCD panel has to be aligned to the upper and lower substrates before the MVA LCD panel can be driven by the field order. In other words, the MVA LCD panel driven by the field order of the present invention does not require to be aligned with the upper substrate or the lower substrate. Referring to FIGS. 19 and 21 for planar views of the TFT substrate in accordance with Embodiment 3 of the present invention and FIG. 23 for a circuit model of the TFT substrate of the invention, a basic unit pixel is divided by the video signal line 17 into two sub pixels: sub pixel A and sub pixel B. The ratio of areas of the sub pixel A to the sub pixel B is approximately equal to 1:2. Even though the data is obtained from the same video signal line 17, the phase is changed by different common electrode, since each pixel electrode 40, 41 is combined with a capacitor of a different common electrode, and a horizontal period (H period) is applied, and the waveform of a signal with an opposite polarity maintains the effective voltage of the sub pixel A greater than the effective voltage of the sub pixel B. FIG. 24 shows the quantity of light transmission of the LCD panel when the signal waveform is driven, and the threshold voltage of the liquid crystals of the sub pixel A and the sub pixel B can be changed for correcting γ.

FIG. 62 shows the process of manufacturing the TFT substrates as illustrated in FIGS. 19 and 21, wherein a common electrode 39 is manufactured in the first the photolithographic procedure. In Embodiment 3, as shown in FIG. 23, it is not necessary to arrange the video signal line 17 in parallel with the common electrode 39, and thus the common electrode 39 is manufactured by the third photolithographic procedure as shown in FIG. 62.

Figure 54:
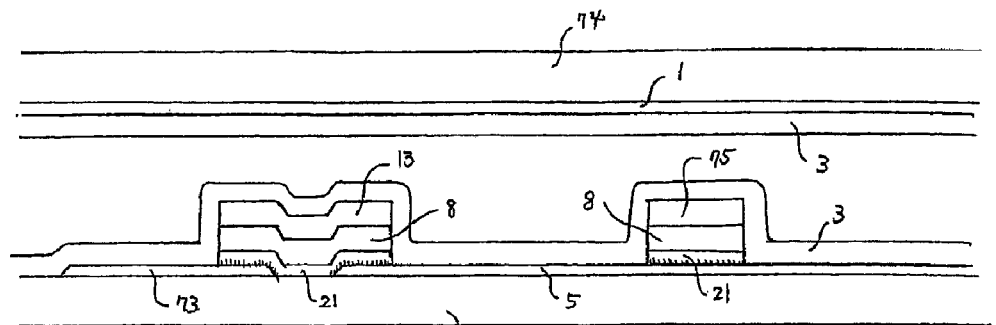
FIG. 54 is cross-sectional view of the structure forming a TFT array substrate of an orientation control electrode connected to a scan line and disposed on the previously formed pixel electrode.
Figure 55:
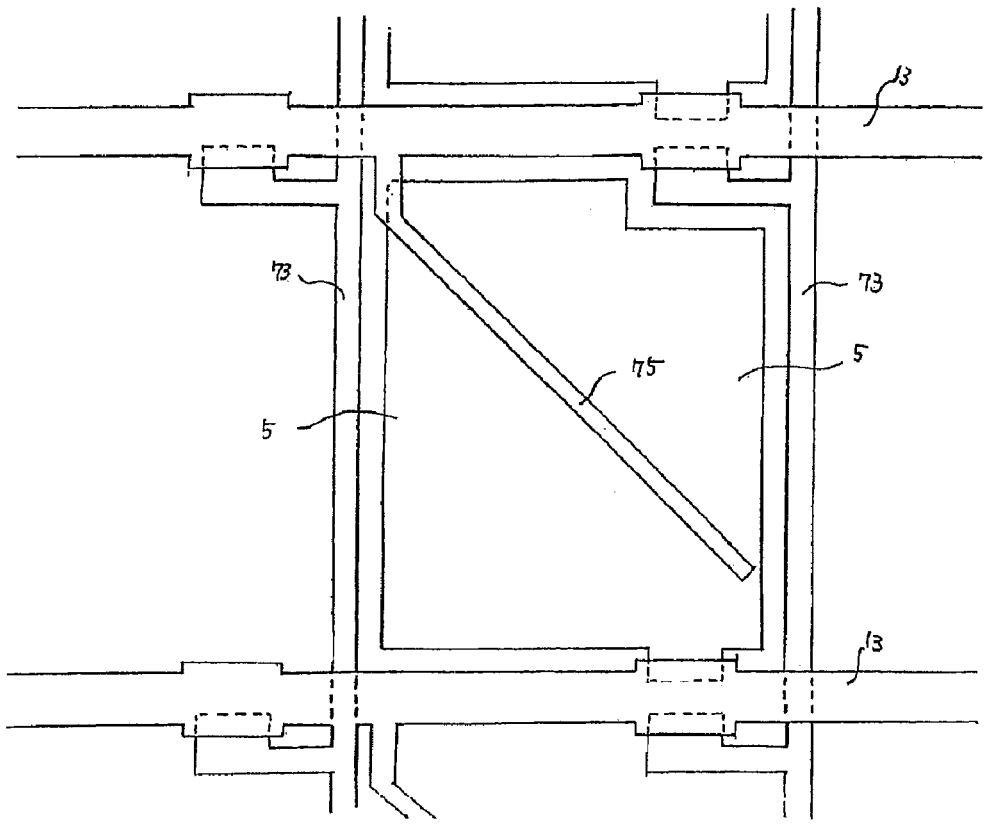
FIG. 55 is a planar view of a TFT array substrate as depicted in FIG. 54.
Figure 56:
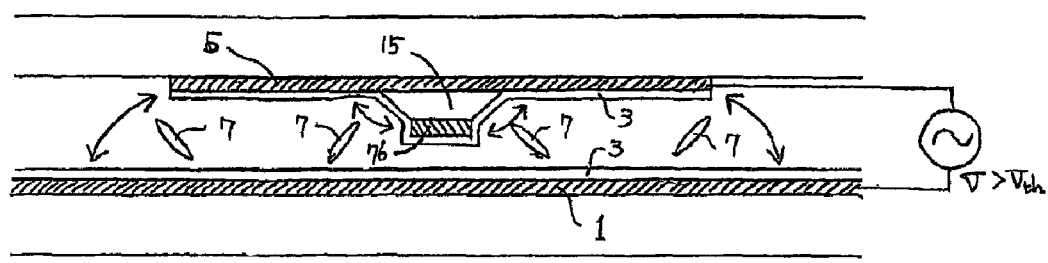
FIG. 56 is a cross-sectional view of forming a vertical alignment cell of one type of orientation control electrode connected to a common electrode and disposed on the previously formed pixel electrode.
Figure 57:
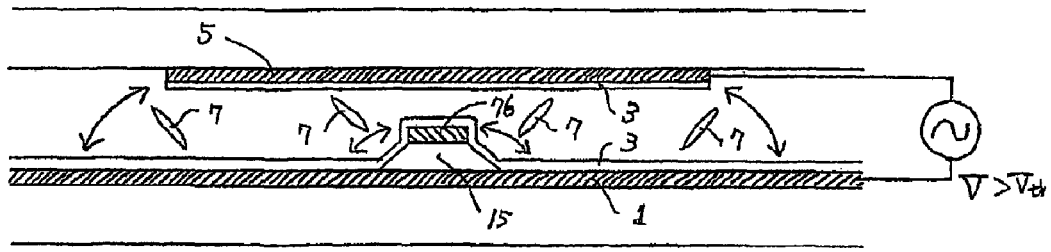
FIG. 57 is a cross-sectional view of a vertical alignment cell of one type of orientation control electrode connected to a pixel electrode and disposed on the previously formed plate electrode.
Figure 58:
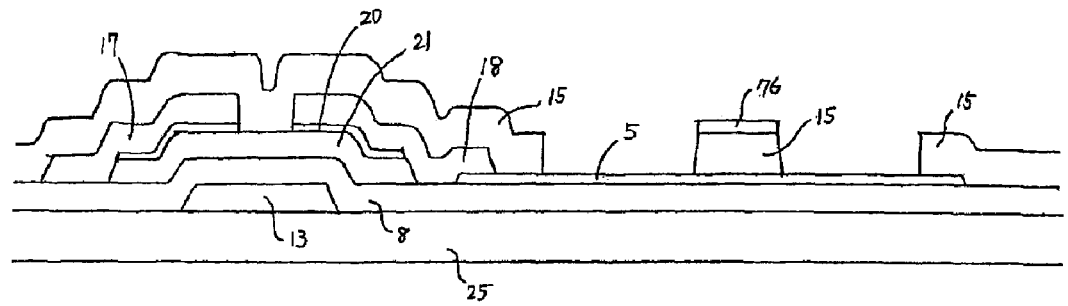
FIG. 58 is a cross-sectional view of a structure of forming only one type of orientation control electrode on a pixel electrode of the previously formed TFT array substrate.
Figure 59:
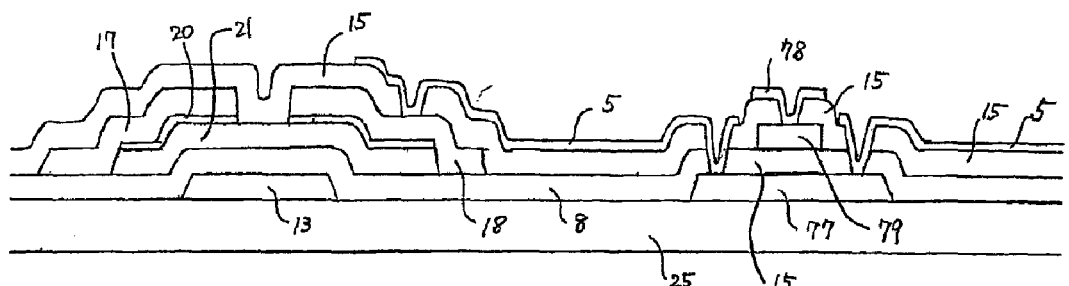
FIG. 59 is a cross-sectional view of a structure of forming only one type of orientation control electrode on a pixel electrode of the previously formed TFT array substrate.
Figure 60:
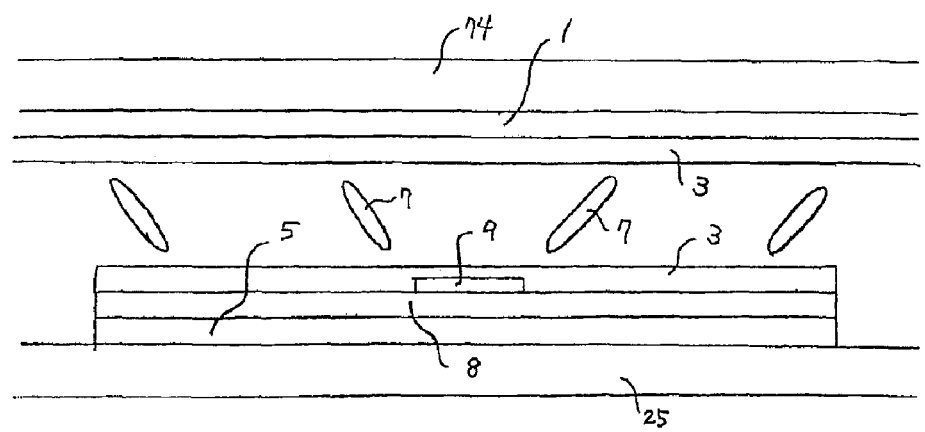
FIG. 60 is a cross-sectional view of a structure of forming only one type of orientation control electrode on a pixel electrode of the previously formed TFT array substrate.

FIG. 53 shows a residual posiresist after general exposure 72; FIG. 54 shows an embodiment of a CF substrate 74; FIG. 55 shows a source electrode 73 formed from transparent electrode 17 (video signal line), an orientation control electrode 75 coupled to the gate electrode 13; FIGS. 56 and 57 shows an orientation control electrode 76 with the same potential of common electrode 16 formed on the passivation film 15; and FIG. 59 shows an orientation control electrode 78 made from transparent electrode material as the pixel electrode.

Figure 25:
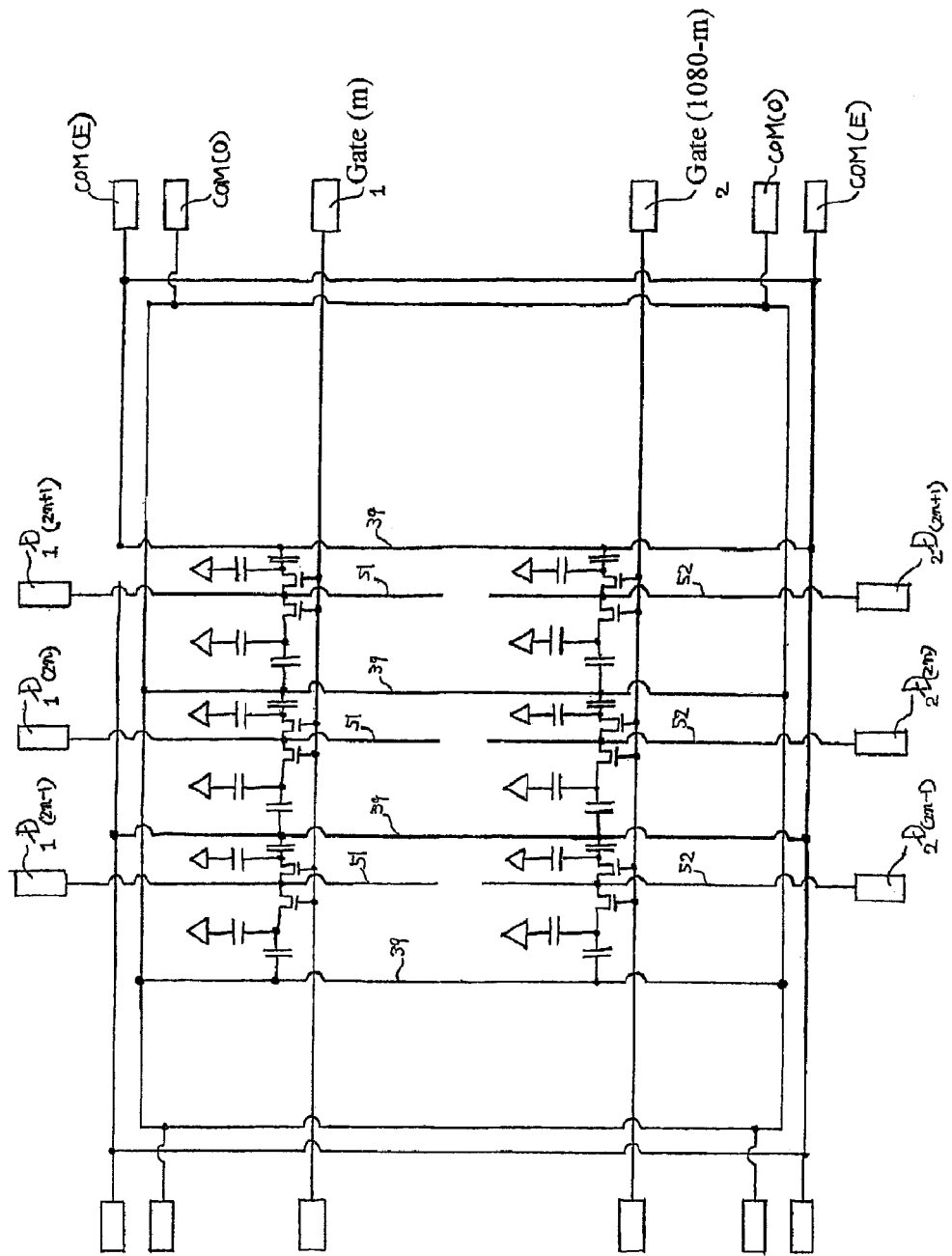
FIG. 25 shows a circuit model of a TFT array substrate that is divided into upper and lower field-order driven MVA LCD panels in accordance with the present invention.

FIG. 25 shows a circuit model of the TFT substrate when a high-precision super large LCD panel is manufactured. FIGS. 26 to 29 show the method of driving a TFT substrate, as illustrated in FIG. 25. FIGS. 26 to 29 relate to the field order driving method. Because the display screen is divided into two: an upper screen and a lower screen, the video signal line 17 is also divided into two: an upper video signal line 51 and a lower video signal line 52, and the video signals 51, 52 of the same polarity are applied.

Figure 26:
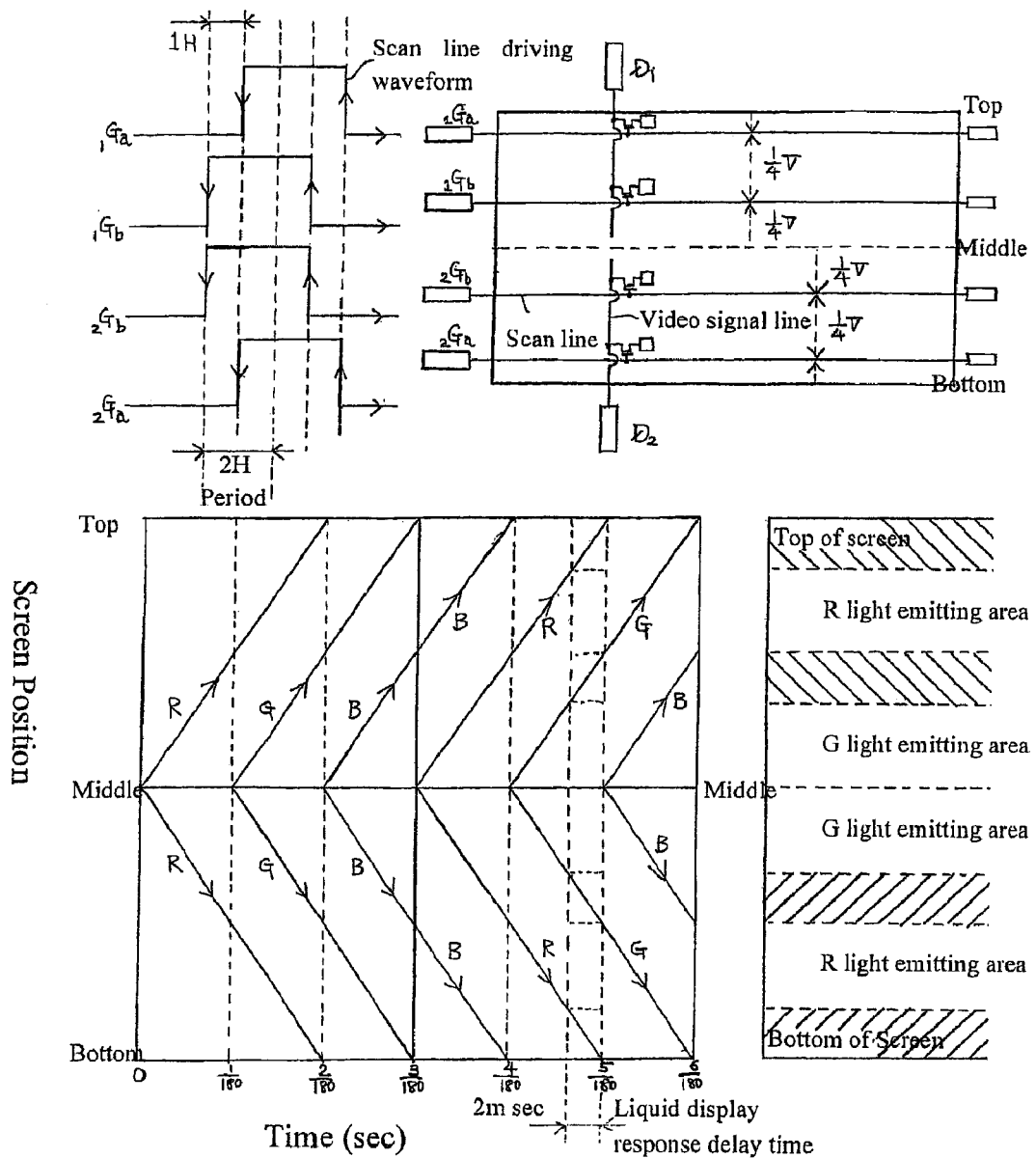
FIG. 26 illustrates a field-order driving method that divides a screen into upper and lower sections and writes data from the center of the screen to the upper or lower section of the screen in accordance with the present invention.
Figure 27:
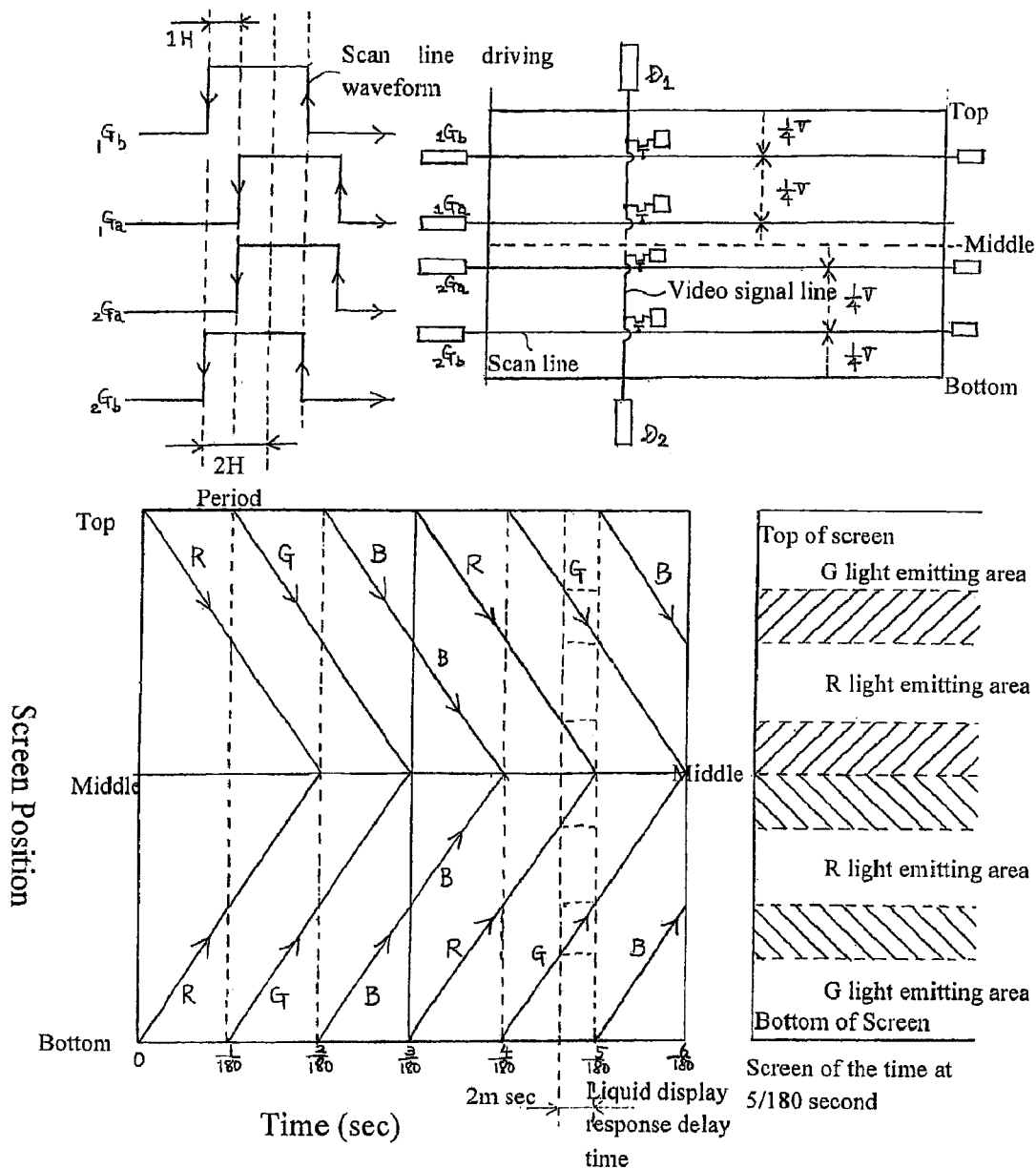
FIG. 27 illustrates a field-order driving method that divides a screen into upper and lower sections and writes data from the upper or lower sections of the screen towards the center of the screen in accordance with the present invention.
Figure 28:
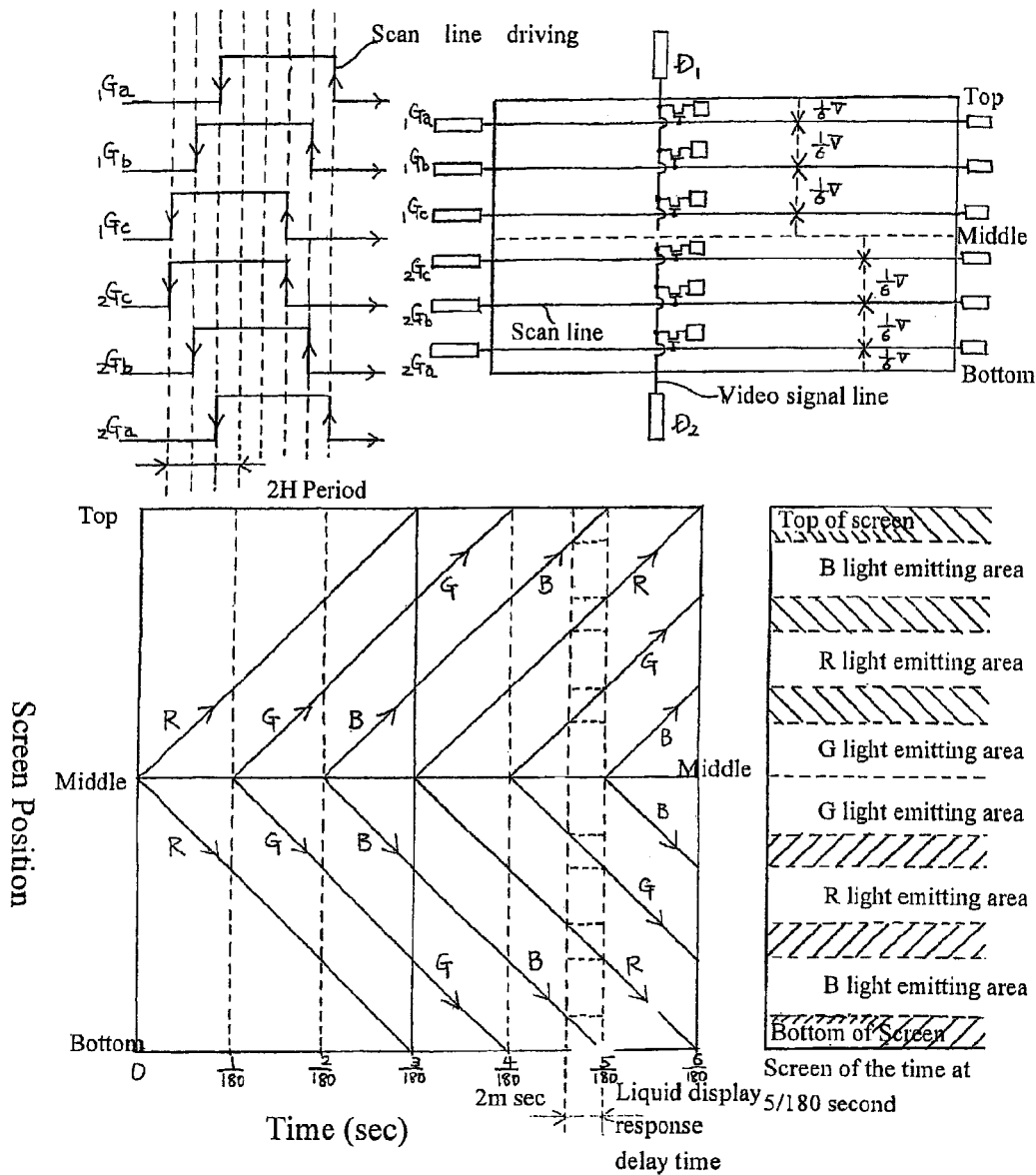
FIG. 28 illustrates a field-order driving method that divides a screen into upper and lower sections and writes data from the center of the screen to the upper or lower section of the screen in accordance with the present invention.
Figure 29:
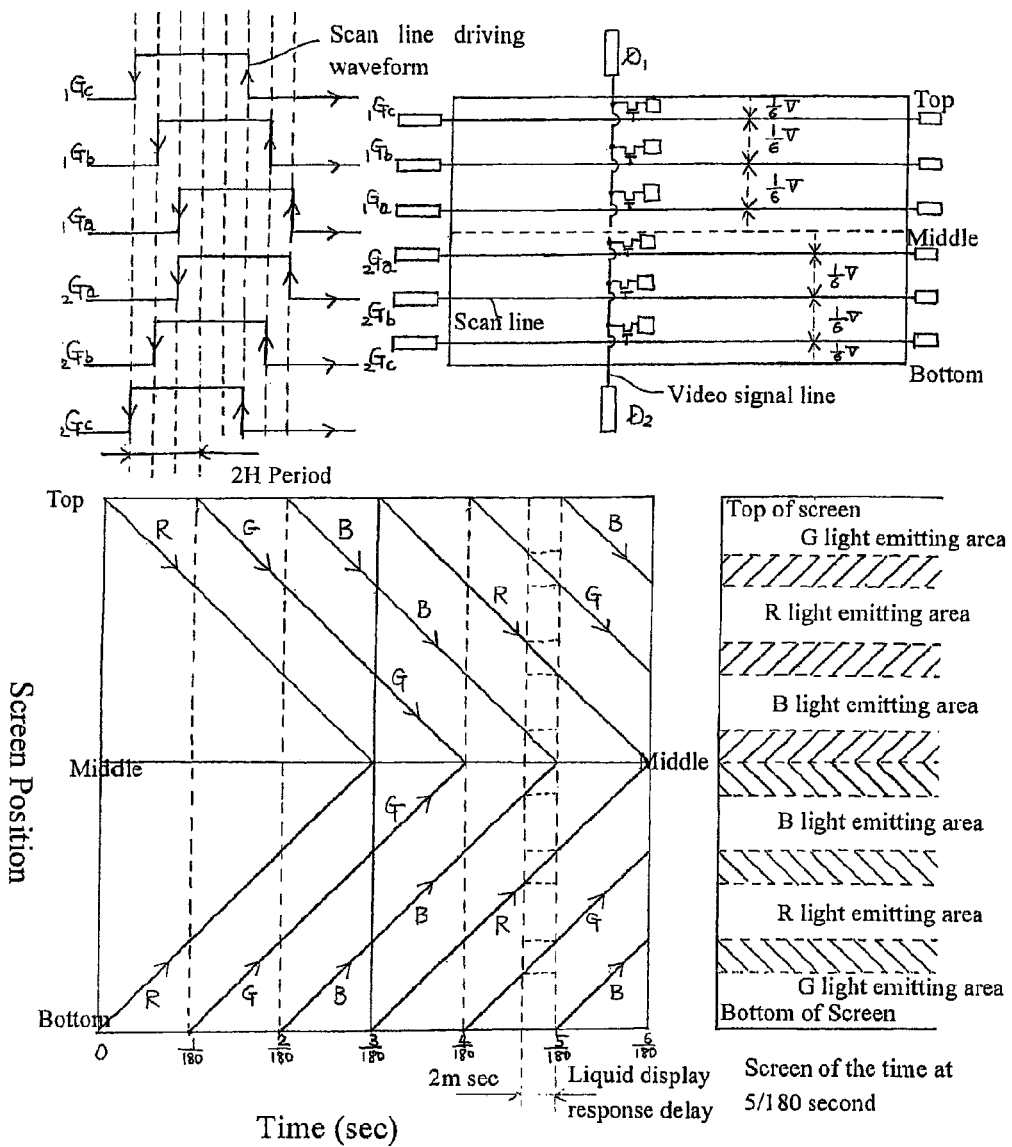
FIG. 29 illustrates a field-order driving method that divides a screen into upper and lower sections and writes data from the upper or lower sections of the screen towards the center of the screen in accordance with the present invention.

The common electrode 39 has not been divided into two, but both upper and lower portions integrated. FIGS. 26 and 28 show that video signals 51, 52 are written from the center of the screen to the upper and lower screens in order to prevent the blocks of the upper and lower screens from being separated. FIGS. 27 and 29 show that video signals 51, 52 are written from the upper and lower screens to the center of the screens. To divide the display screen into two, the horizontal scan period is extended to two times of 2H. FIGS. 26 and 27 show that the horizontal scan period is divided into two, such that different video signals can be written for two pixels by two different multitasking methods. FIGS. 28 and 29 show that the horizontal scan period is divided into three, such that different video signals 51, 52 can be written for three pixels by three multitasking methods.

Figure 31:
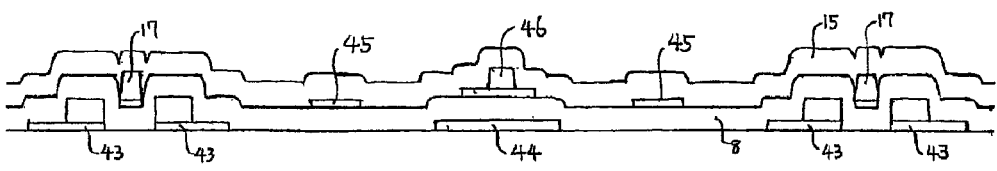
FIG. 31 is a cross-sectional view of a basic unit pixel of a TFT array substrate of a horizontal electric field LCD panel in accordance with the present invention.
Figure 32:
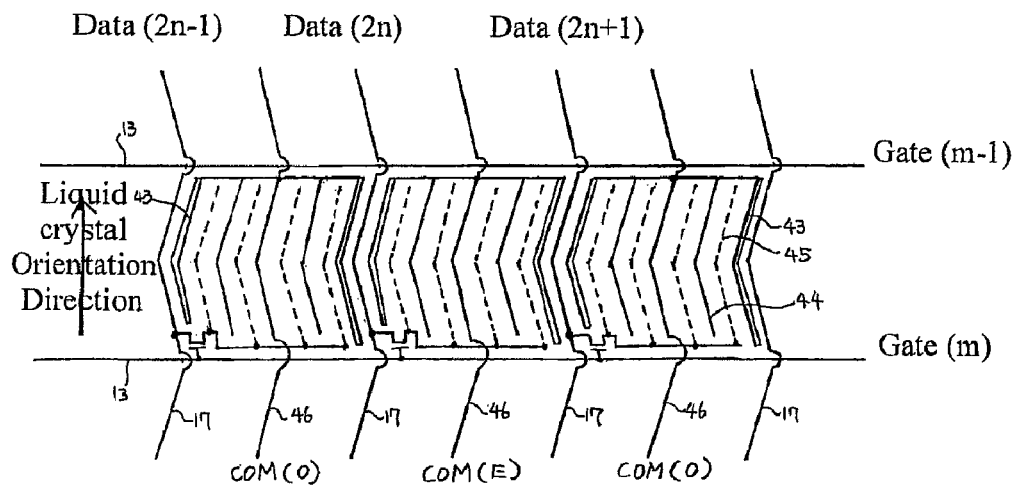
FIG. 32 shows a circuit model of a circuit of a TFT array substrate of a field-order driven horizontal electric field LCD panel in accordance with the present invention.
Figure 34:
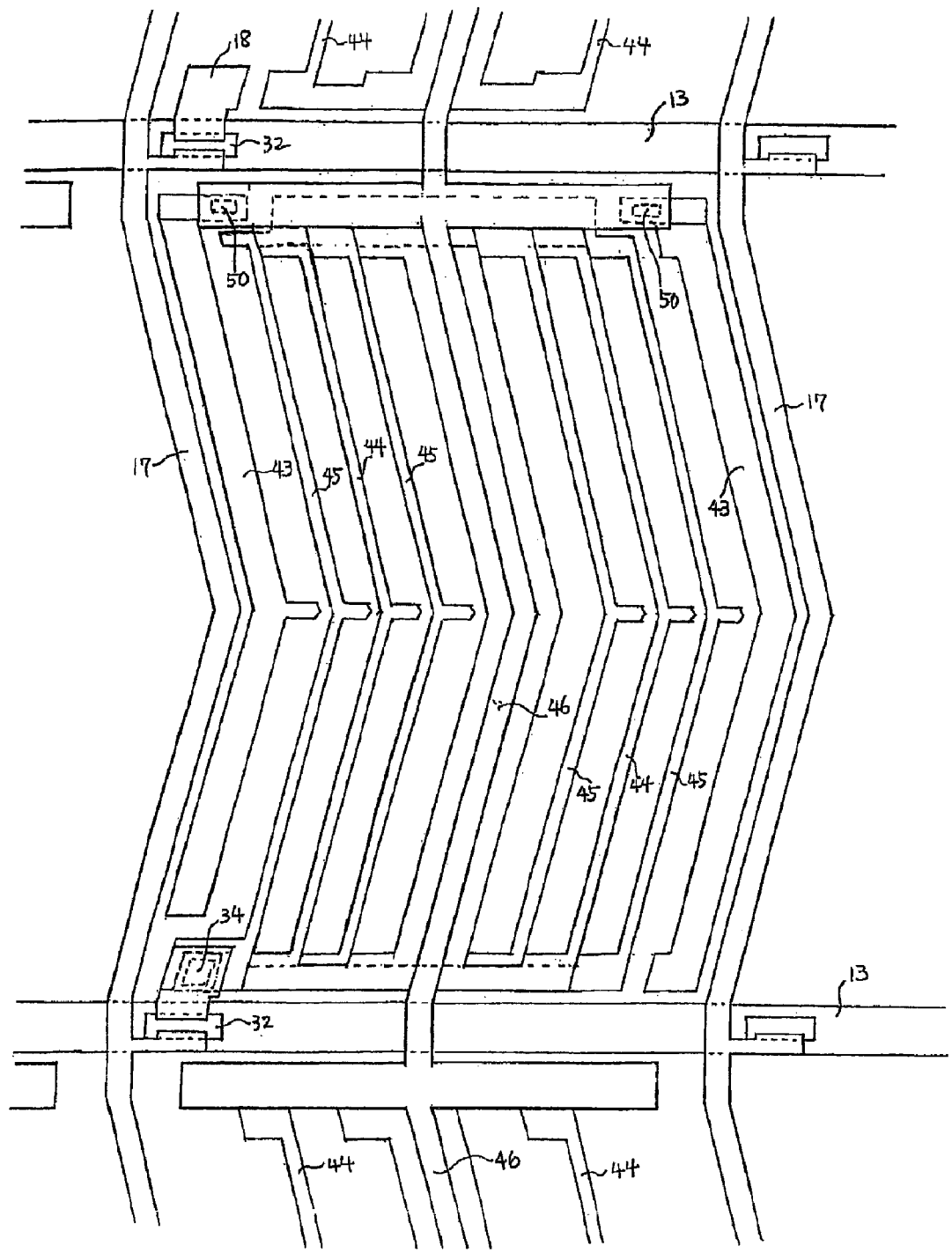
FIG. 34 is a planar view of a TFT array substrate of a horizontal electric field LCD panel in accordance with the present invention.
Figure 36:
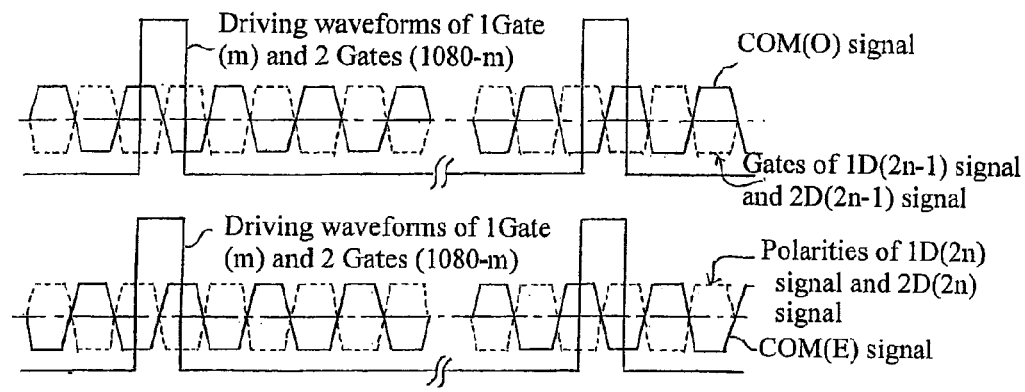
FIG. 36 is a waveform diagram of a horizontal electric field LCD panel as depicted in FIG. 35.
Figure 37:
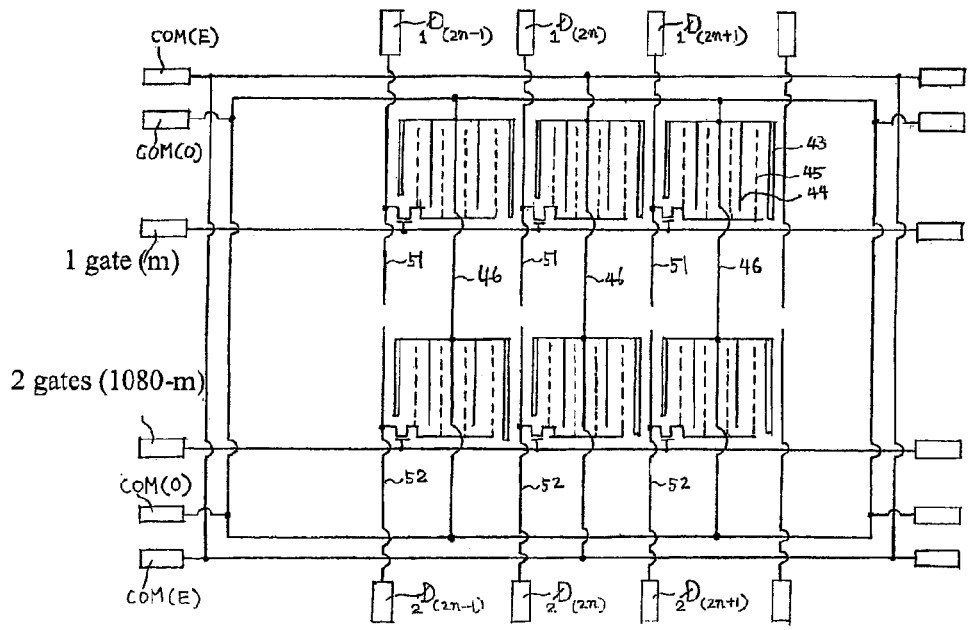
FIG. 37 shows a circuit model of a TFT array substrate of a field-order driven horizontal electric field LCD panel that divides a display screen into upper and lower sections in accordance with the present invention.

Referring to FIGS. 31 and 34 for a planar view and a cross-sectional view of an IPS TFT substrate in accordance with Embodiment 4 of the present invention, and FIG. 63 for the manufacturing process of an IPS TFT substrate in accordance with Embodiment 4 of the present invention, three times of photolithographic procedure adopting three times of halftone exposure method are conducted. FIG. 32 shows a circuit model of a TFT substrate as illustrated in FIG. 34. The center of a pixel and the video signal 17 are arranged in parallel with the common electrode 46. FIG. 37 shows a circuit model of a TFT substrate when a high-precision supper large LCD panel is manufactured. FIG. 36 shows a driving waveform diagram of a TFT substrate as illustrated in FIG. 37. Signal waveforms of different polarities are applied on even-numbered rows and odd-numbered rows, and signal waveforms of different polarities are applied to the even-numbered rows and odd-numbered row of video signal waveforms, and a signal with an opposite polarity is applied to the common electrode 46 of each corresponding video signal line 51, 52.

Although the modes of liquid crystals are different, the circuit models of the common electrode 46 and the video signal line 51, 52 is identical to those as shown in FIG. 25. The IPS TFT substrate as shown in FIG. 37 can also adopt the same field order driving method of Embodiment 3. Similar to the process shown in FIG. 25, the process shown in FIG. 37 divides the display screen into two: an upper screen and a lower screen, and thus the video signal line 17 is also divided into two: an upper video signal line 51 and a lower video signal line 52, and the polarity of video signals are the same.

The common electrode 46 has not been divided into two, but it is connected from top to bottom as a whole. To prevent the blocks of upper and lower screens from being separated, the video signals 51, 52 are written from the center of the screen upward or downward, or the video signals 51, 52 are written from the top or bottom of the screen towards the center of the screen. The driving method for the scan lines 13 is identical to that of Embodiment 3.

Figure 30:
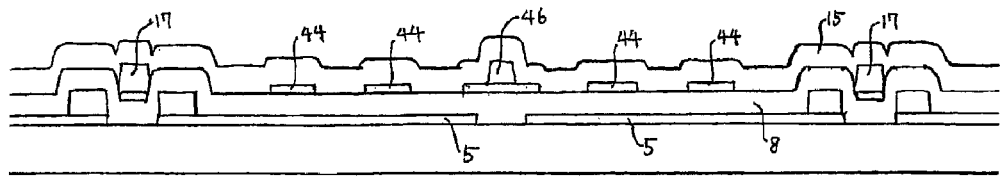
FIG. 30 is a cross-sectional view of a basic unit pixel of a TFT array substrate of a horizontal electric field LCD panel in accordance with the present invention.
Figure 33:
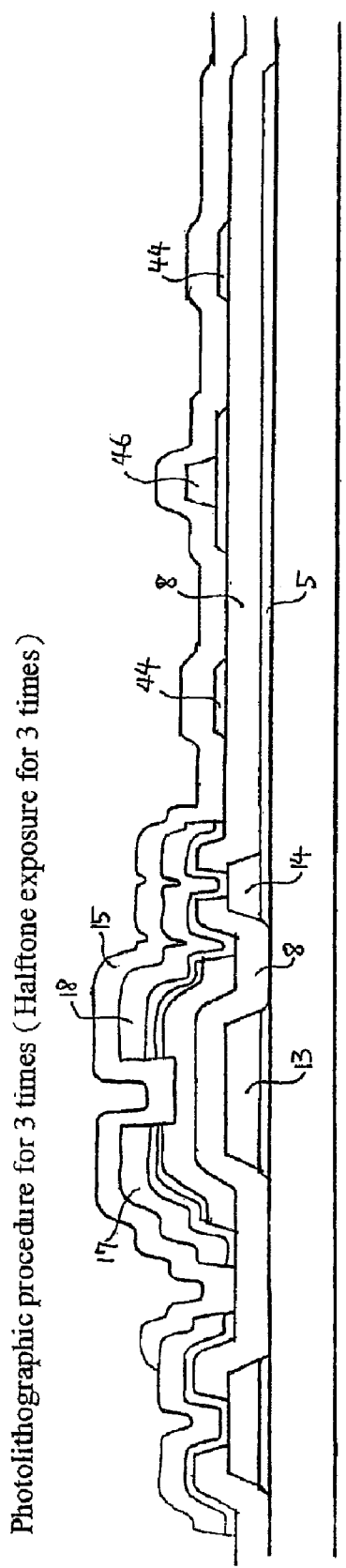
FIG. 33 is a cross-sectional view of a TFT array substrate of a horizontal electric field LCD panel in accordance with the present invention.
Figure 35:
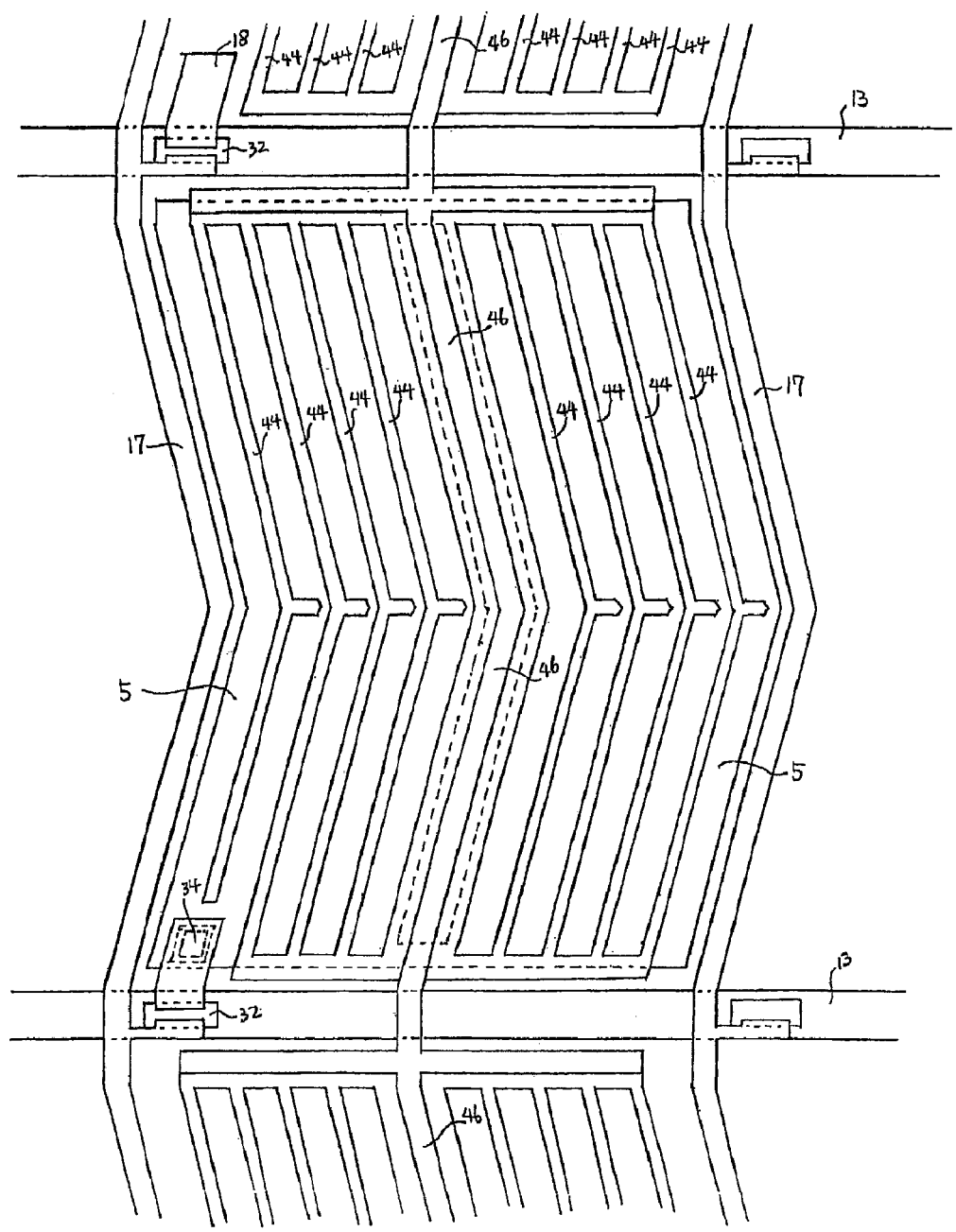
FIG. 35 is a planar view of a TFT array substrate of a horizontal electric field LCD panel in accordance with the present invention.

Referring to FIGS. 30 and 35 for a planar view and a cross-sectional view of a FFS TFT substrate in accordance with Embodiment 5 of the present invention respectively, FIG. 33 for a cross-sectional view of a portion of a thin film transistor, and FIG. 64 for the manufacturing process of a FFS TFT substrate in accordance with Embodiment 5 of the present invention, the photolithographic procedure is conducted for three times, and a halftone exposure method is applied for all of the three times. The three times of photolithographic procedure in Embodiments 4 and 3 use the halftone exposure method as shown in FIG. 47A. Unlike the vertical alignment LCD panel, a horizontal electric field panel requires a different alignment processing procedure (such as the friction processing). To prevent having a poor alignment area, it is necessary to minimize the roughness of the TFT substrate. However, the planar views of FIGS. 34 and 35 show that the thickness of electrodes 44, 45 is increased to lower the resistance of a common electrode 46 at the center of the screen.

Because a poor alignment area, as shown in FIG. 47B, must occur in both IPS and FFS modes, the shortcoming of being unable to show the black color for a black potential exists. To minimize the poor alignment area, it is necessary to apply the halftone exposure method for three times.

FIGS. 42 and 43 use the manufacturing process as illustrated in FIG. 64, and the process of the halftone exposure method is applied for one time, and any one can be selected. FIG. 44 illustrates the process of applying the halftone exposure method for the second time, FIG. 45 illustrates the process of applying the halftone exposure method for three times, and FIG. 46 illustrates the process of performing the photolithographic procedure for four times for manufacturing the FFS TFT substrate. The halftone exposure method is applied for two times.

Even if the FFS TFT substrate as shown in FIG. 35 adopts the same driving method as the IPS TFT substrate as shown in FIG. 34, all circuit models of the TFT substrate as shown in FIG. 37 can be applicable for the FFS mode of FIG. 35. If the driving method of FIG. 36 is used, the FFS mode with a high driving voltage can be driven easily. Because the FFS mode can produce a strong electric field, the response rate of the liquid crystal molecules is smaller than that of the IPS mode and applicable for the field order driving method. Particularly, a high voltage can be applied to the LCD panels as shown in FIGS. 36 and 37, and thus such method is considered as a driving method applicable for high-speed operations, and most suitable for the field order driving method for the divided upper and lower screens as shown in FIGS. 26 to 29.

What is claimed is:

1. An active matrix vertical alignment liquid crystal display apparatus, comprising:
   transparent pixel electrodes, scan lines are formed on a thin film transistor (TFT) substrate;
   a transparent insulating film is formed on transparent pixel electrodes, and video signal lines and common lines are formed on the transparent insulating film;
   transparent pixel electrodes are electrically connected to drain electrodes of TFT;
   first liquid crystal alignment control electrodes and second liquid crystal alignment control electrodes are formed on the transparent insulating film, or are formed on a passivation film of TFT;
   the first liquid crystal alignment control electrodes and the second liquid crystal alignment control electrodes are slender and parallel with each other, and are positioned alternately;
   the first liquid crystal alignment control electrodes are electrically connected to a transparent pixel electrode; and the second liquid crystal alignment control electrodes are electrically connected to a common line in a pixel
   the transparent pixel electrodes are closer to the video signal lines and the common lines than the liquid crystal alignment control electrodes, and the first liquid crystal alignment control electrodes are closer to the video signal lines and the common lines than the second liquid crystal alignment control electrodes;
   the video signal lines are aligned in parallel with odd-numbered columns and even-numbered columns of common electrode, and a voltage is applied to signals with different opposite polarities within a horizontal scan period (H period);
   a transparent common electrode is positioned opposite to the TFT substrate, and is connected to common lines formed on the TFT substrate, and there are no slits in the transparent common electrode, and there are no bumps on the transparent common electrode.

\* \* \* \* \*